(12) United States Patent
Volkerink et al.

(10) Patent No.: US 11,776,380 B2
(45) Date of Patent: Oct. 3, 2023

(54) CLIENT DEVICE INTERACTIONS AND ASSET MONITORING AT CHECKPOINT LOCATIONS IN AN IOT DEVICE NETWORK

(71) Applicant: Trackonomy Systems, Inc., San Jose, CA (US)

(72) Inventors: Hendrik J Volkerink, Palo Alto, CA (US); Ajay Khoche, West San Jose, CA (US)

(73) Assignee: TRACKONOMY SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/834,925

(22) Filed: Jun. 7, 2022

(65) Prior Publication Data
US 2022/0309899 A1 Sep. 29, 2022

Related U.S. Application Data

(63) Continuation-in-part of application No. 17/677,994, filed on Feb. 22, 2022.

(60) Provisional application No. 63/243,136, filed on Sep. 11, 2021, provisional application No. 63/197,629, filed on Jun. 7, 2021, provisional application No. 63/160,673, filed on Mar. 12, 2021, provisional application No. 63/151,603, filed on Feb. 19, 2021.

(51) Int. Cl.
*G08B 21/18* (2006.01)
(52) U.S. Cl.
CPC .................. *G08B 21/182* (2013.01)
(58) Field of Classification Search
CPC ...................... G08B 21/182; G06Q 10/087
See application file for complete search history.

(56) References Cited

U.S. PATENT DOCUMENTS

| 5,917,433 A | 6/1999 | Keillor et al. |
| 6,265,977 B1 | 7/2001 | Vega et al. |
| 6,437,702 B1 | 8/2002 | Ragland |

(Continued)

FOREIGN PATENT DOCUMENTS

| AU | 2018204317 A1 | 1/2019 |
| AU | 2018250358 A1 | 5/2019 |

(Continued)

OTHER PUBLICATIONS

International Patent Application No. PCT/US2020/023007, International Search Report and Written Opinion dated Jun. 15, 2020, 9 pages.

(Continued)

*Primary Examiner* — Ojiako K Nwugo

(57) ABSTRACT

A system for tracking assets at a location includes an infrastructure node associated with a tracking system located at the location comprising a wireless communication device configured to wirelessly communicate with other wireless nodes of the tracking system and a plurality of wireless tracking devices, according to some embodiments. The infrastructure node is associated with the location, and each of the wireless tracking devices of the plurality of wireless tracking devices is associated with an asset being tracked by the tracking system. In embodiments, the infrastructure node is used to collect data from the wireless tracking devices, relay the data to client devices, and detect unauthorized removal or addition of assets to the location.

18 Claims, 32 Drawing Sheets

(56) References Cited

U.S. PATENT DOCUMENTS

| | | | |
|---|---|---|---|
| 6,522,874 B1 | 2/2003 | Chu et al. | |
| 6,614,392 B2 | 9/2003 | Howard | |
| 6,919,803 B2 | 7/2005 | Breed | |
| 6,972,682 B2 | 12/2005 | Lareau | |
| 7,009,517 B2 | 3/2006 | Wood | |
| 7,353,259 B1 | 4/2008 | Bakke et al. | |
| 7,427,918 B2 | 9/2008 | Fano | |
| 8,095,070 B2 | 1/2012 | Twitchell, Jr. | |
| 8,989,053 B1* | 3/2015 | Skaaksrud | G06Q 30/0267 370/255 |
| 9,182,231 B2 | 11/2015 | Skaaksrud | |
| 9,189,226 B2 | 11/2015 | Driesen et al. | |
| 9,228,911 B1 | 1/2016 | Meyers | |
| 9,542,581 B1* | 1/2017 | Gehner | G06K 7/10415 |
| 9,740,976 B2 | 8/2017 | Ozaki et al. | |
| 9,824,329 B2 | 11/2017 | Stirling et al. | |
| 9,860,688 B2 | 1/2018 | Kulkarni et al. | |
| 10,758,943 B1 | 9/2020 | Carpenter | |
| 10,902,240 B2 | 1/2021 | Adato et al. | |
| 11,115,732 B2 | 9/2021 | Lucrecio et al. | |
| 2001/0052851 A1 | 12/2001 | Mathias et al. | |
| 2002/0089434 A1 | 7/2002 | Ghazarian | |
| 2003/0018927 A1 | 1/2003 | Gadir et al. | |
| 2003/0089771 A1 | 3/2003 | Cybulski et al. | |
| 2004/0066274 A1 | 4/2004 | Bailey | |
| 2004/0224640 A1 | 11/2004 | MacFarland | |
| 2006/0055552 A1 | 3/2006 | Chung et al. | |
| 2006/0187033 A1 | 8/2006 | Hall et al. | |
| 2007/0035397 A1 | 2/2007 | Patenaude et al. | |
| 2007/0049291 A1 | 3/2007 | Kim et al. | |
| 2007/0077943 A1* | 4/2007 | Hamilla | G06Q 10/087 455/457 |
| 2007/0085677 A1 | 4/2007 | Neff et al. | |
| 2007/0095905 A1 | 5/2007 | Kadaba | |
| 2007/0164858 A1 | 7/2007 | Webb | |
| 2007/0164863 A1 | 7/2007 | Himberger et al. | |
| 2008/0018492 A1 | 1/2008 | Ehrke et al. | |
| 2008/0026713 A1* | 1/2008 | Sekhar | G08B 13/19656 455/187.1 |
| 2008/0239282 A1 | 10/2008 | Zou et al. | |
| 2009/0309734 A1 | 12/2009 | Jayaprakash et al. | |
| 2009/0322510 A1 | 12/2009 | Beger et al. | |
| 2010/0082870 A1 | 4/2010 | Tokuhara | |
| 2010/0299401 A1 | 11/2010 | Lloyd | |
| 2011/0068922 A1 | 3/2011 | Ross | |
| 2011/0127325 A1 | 6/2011 | Hussey et al. | |
| 2011/0202554 A1 | 8/2011 | Powilleit et al. | |
| 2012/0075343 A1 | 3/2012 | Chen et al. | |
| 2012/0320204 A1* | 12/2012 | Dahlin | G08G 1/09623 348/148 |
| 2013/0002443 A1 | 1/2013 | Breed et al. | |
| 2013/0070636 A1 | 3/2013 | Farley | |
| 2013/0107770 A1 | 5/2013 | Marsden et al. | |
| 2013/0211976 A1 | 8/2013 | Breed | |
| 2013/0278412 A1 | 10/2013 | Kelly et al. | |
| 2014/0062699 A1 | 3/2014 | Heine et al. | |
| 2015/0154531 A1 | 6/2015 | Skaaksrud | |
| 2015/0156747 A1 | 6/2015 | Skaaksrud | |
| 2015/0227245 A1 | 8/2015 | Inagaki et al. | |
| 2015/0312653 A1 | 10/2015 | Avrahami et al. | |
| 2015/0349917 A1* | 12/2015 | Skaaksrud | H04B 17/3913 370/328 |
| 2015/0366518 A1 | 12/2015 | Sampson | |
| 2016/0055454 A1 | 2/2016 | Kazanchian | |
| 2016/0104099 A1 | 4/2016 | Villamar | |
| 2016/0142868 A1* | 5/2016 | Kulkarni | H04W 4/80 455/456.5 |
| 2016/0233927 A1 | 8/2016 | Wu | |
| 2016/0260059 A1 | 9/2016 | Benjamin et al. | |
| 2017/0039666 A1 | 2/2017 | Kuersten et al. | |
| 2017/0078950 A1 | 3/2017 | Hillary et al. | |
| 2018/0012472 A1 | 1/2018 | Purcell | |
| 2018/0046964 A1 | 2/2018 | Leoni et al. | |
| 2018/0086306 A1 | 3/2018 | Schmotzer et al. | |
| 2018/0132183 A1 | 5/2018 | Gattu | |
| 2018/0163095 A1 | 6/2018 | Khoche | |
| 2018/0165568 A1 | 6/2018 | Khoche | |
| 2018/0321356 A1* | 11/2018 | Kulkarni | H04W 64/003 |
| 2018/0374039 A1 | 12/2018 | Walden et al. | |
| 2019/0012936 A1 | 1/2019 | Yazdi et al. | |
| 2019/0037362 A1 | 1/2019 | Nogueira-Nine | |
| 2019/0113632 A1 | 4/2019 | Lucrecio et al. | |
| 2019/0236531 A1 | 8/2019 | Adato et al. | |
| 2019/0236873 A1 | 8/2019 | Estill | |
| 2020/0104790 A1 | 4/2020 | Chung | |
| 2020/0223066 A1 | 7/2020 | Diankov et al. | |
| 2020/0285726 A1 | 9/2020 | Kalous | |
| 2020/0405223 A1 | 12/2020 | Mai et al. | |

FOREIGN PATENT DOCUMENTS

| | | |
|---|---|---|
| CA | 3061878 A1 | 11/2018 |
| CA | 3008512 A1 | 12/2018 |
| JP | 2008239282 | 10/2008 |
| WO | WO 2014153418 A1 | 9/2014 |
| WO | WO 2017/196190 A1 | 11/2017 |
| WO | WO 2018053309 A1 | 3/2018 |
| WO | WO 2021/086248 A1 | 5/2021 |

OTHER PUBLICATIONS

International Patent Application No. PCT/US2022/013729 International Search Report and Written Opinion dated Jun. 6, 2022, 11 pages.

International Patent Application No. PCT/US2022/015161 International Search Report and Written Opinion dated Jul. 1, 2022, 15 pages.

U.S. Appl. No. 16/776,804, Final Office Action dated Feb. 3, 2022, 20 pages.

International Patent Application No. PCT/US2021/053028 International Search Report and Written Opinion dated Jan. 12, 2022, 11 pages.

International Patent Application No. PCT/US2021/034112, International Search Report and Written Opinion dated Oct. 22, 2021, 14 pages.

Nisarga et al. "System-Level Tamper Protection Using MSP MCUs." Texas Instruments, Aug. 2016, 13 pages.

Sanchez et al. Machine Learning on Difference Image Analysis: A comparison of Methods for Transient Detection.

PCT Application No. PCT/US2020/014521 International Preliminary Report on Patentability, dated Jul. 27, 2021, 6 pages.

U.S. Appl. No. 16/776,804, Non-Final Office Action dated Jul. 15, 2021, 9 pages.

U.S. Appl. No. 16/517,508, Non-Final Office Action dated Jan. 7, 2021, 10 pages.

U.S. Appl. No. 16/517,508, Non-Final Office Action dated May 6, 2020, 35 pages.

Shen et al., "A mobility framework to improve heterogeneous wireless network services" Inderscience Enterprises Ltd., 2011, pp. 60-69.

International Search Report and Written Opinion, International application No. PCT/US2019/042488 dated Nov. 5, 2019, 12 pages.

International Search Report and Written Opinion, International application No. PCT/US2019/046588 dated Jan. 6, 2020, 9 pages.

Iacono, Wireless Sensor Network Protocols, Universidad De Mendoza, Argentina, 2011.

M.A. Matin et al., Overview of Wireless Sensor Network, Intech, 2012 (http://dx.doi.org/10.5772/49376.1).

Cimino et al., "Wireless communication, identification, and sensing technologies enabling integrated logistics: a study in the harbor environment," Research Gate, Oct. 2015.

International Patent Application No. PCT/US2019/046588, International Preliminary Report on Patentability, dated Feb. 16, 2021, 7 pages.

PCT Application No. PCT/US2022/032582 International Search Report and Written Opinion dated Aug. 25, 2022, 17 pages.

European Patent Application No. 19850357.5 extended European search report dated Feb. 25, 2022, 7 pages.

(56) References Cited

OTHER PUBLICATIONS

U.S. Appl. No. 17/449,582 Non-Final Office Action dated Sep. 9, 2022, 16 pages.
International Patent Application No. PCT/US2022/47338 International Search Report and Written Opinion dated Apr. 7, 2023, 15 pages.

* cited by examiner

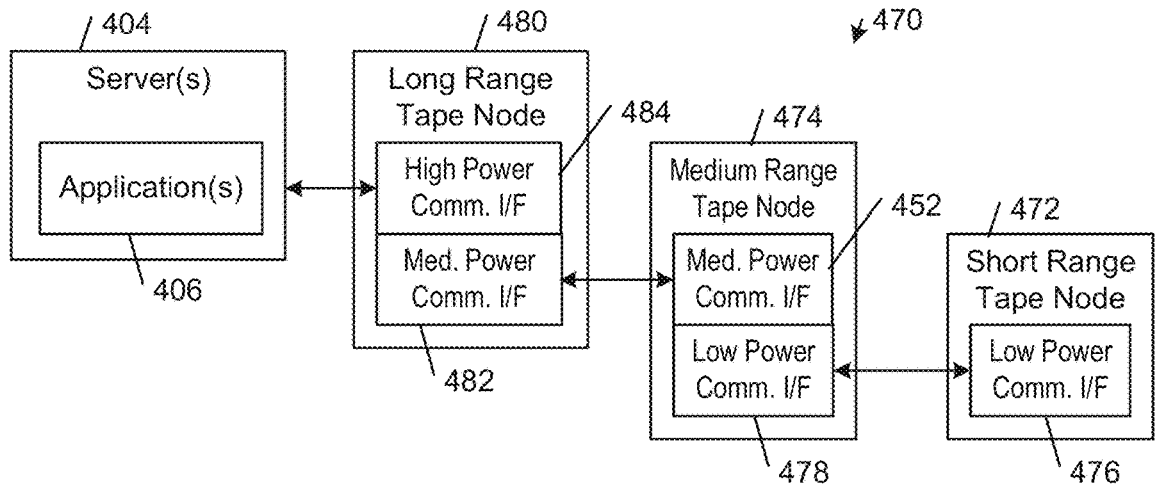

FIG. 8

```
┌─────────────────────────────────────────────────────────────┐
│ Adhering A First Tape Node To A First Asset, The First Tape │
│ Node Including A First Type Of Wireless Communication       │ 490
│ Interface And A Second Type Of Wireless Communication       │
│ Interface Having A Longer Range Than The First Type Of      │
│ Wireless Communication Interface                            │
└─────────────────────────────────────────────────────────────┘
                            ↓
┌─────────────────────────────────────────────────────────────┐
│ Adhering A Second Tape Node To A Second Asset, The Second   │
│ Tape Node Including The First Type Of Wireless Communication│
│ Interface, Wherein The Second Tape Node Is Operable To      │ 492
│ Communicate With The First Tape Node Over A Wireless        │
│ Communication Connection Established Between The First Type │
│ Of Wireless Communication Interfaces Of The First And       │
│ Second Tape Nodes                                           │
└─────────────────────────────────────────────────────────────┘
                            ↓
┌─────────────────────────────────────────────────────────────┐
│ Establishing, By A Server, A Wireless Communication         │
│ Connection With The Second Type Of Wireless Communication   │
│ Interface Of The First Tape Node, And Designating, By The   │ 494
│ Server, The First Tape Node As A Master Node Of The Second  │
│ Tape Node                                                   │
└─────────────────────────────────────────────────────────────┘
```

```
┌─────────────────────────────────────────────────────────────┐
│ Detect, By A Drop-Off Node Associated With A Drop-Off Area, │
│ That One Or More Tracking Devices, Each Tracking Device     │── 2410
│ Associated With An Asset, Is In The Drop-Off Area           │
└─────────────────────────────────────────────────────────────┘
                              │
┌─────────────────────────────────────────────────────────────┐
│ Establish A Communication Connection Between The Drop-Off   │── 2412
│ Node And The One Or More Tracking Devices                   │
└─────────────────────────────────────────────────────────────┘
                              │
┌─────────────────────────────────────────────────────────────┐
│ Receive, By The Drop-Off Node, Tracking Data From The One   │── 2414
│ Or More Tracking Devices                                    │
└─────────────────────────────────────────────────────────────┘
                              │
┌─────────────────────────────────────────────────────────────┐
│ Detect, By The Drop-Off Node, That A Client Device          │── 2416
│ Associated With A Human Operator Is In The Drop-Off Area    │
└─────────────────────────────────────────────────────────────┘
                              │
┌─────────────────────────────────────────────────────────────┐
│ Authenticate, By The Drop-Off Node, The Client Device       │── 2418
└─────────────────────────────────────────────────────────────┘
                              │
┌─────────────────────────────────────────────────────────────┐
│ Responsive To Authenticating The Client Device As An        │
│ Authorized Client Device, Transmit, By The Drop-Off Node,   │── 2420
│ The Tracking Data To The Client Device, Whereby The Client  │
│ Device Uploads The Data To The Wireless Tracking System     │
└─────────────────────────────────────────────────────────────┘
```

Detect, By A Client Device, That The Client Device Is Near A Drop-Off Node Associated With A Drop-Off Area — 2510

Establish A Communication Connection Between The Drop-Off Node And The Client Device — 2512

Authenticate The Client Device — 2514

Responsive To Authenticating That Client Device Is An Authorized Client Device, Receive, By The Client Device, Tracking Data Collected By The Drop-Off Node From One Or More Tracking Devices, Each Tracking Device Associated With An Asset, That Was In The Drop-Off Area — 2516

Determine, By The Client Device, That An Alert Condition Has Been Triggered Based On The Received Tracking Data — 2518

Transmit, By The Client Device, An Alert To Other Nodes Of The Wireless Tracking System — 2520

(Optionally) Upload, By The Client Device, A Subset Of The Tracking Data To The Wireless Tracking System — 2522

FIG. 25

CLIENT DEVICE INTERACTIONS AND ASSET MONITORING AT CHECKPOINT LOCATIONS IN AN IOT DEVICE NETWORK

CROSS-REFERENCE TO RELATED APPLICATIONS

This application is a continuation-in-part of U.S. Nonprovisional patent application Ser. No. 17/677,994, filed on Feb. 22, 2022, which claims priority to U.S. Provisional Patent Application No. 63/151,603, filed on Feb. 19, 2021, and to U.S. Provisional Patent Application No. 63/160,673, filed on Mar. 12, 2021. This application also claims priority to U.S. Provisional Patent Application No. 63/197,629, filed on Jun. 7, 2021, and to U.S. Provisional Patent Application No. 63/243,136, filed on Sep. 11, 2021. All of the above-referenced applications are incorporated herein in their entirety.

FIELD OF THE DISCLOSURE

This disclosure generally relates to wireless internet of things (IOT) devices, in particular to tracking and locating assets in an IOT device network.

BACKGROUND

In environments with large numbers of assets, tracking devices running out of battery or experiencing anomalous conditions affecting ability to communicate effectively may cause assets to become "lost" or unable to be located. Further, in large environments, it is often difficult to test infrastructure throughout the system. A means for locating lost assets and testing infrastructure in busy environments, such as logistics hubs, is needed.

SUMMARY

A system for tracking assets at a location includes an infrastructure node associated with a tracking system located at the location comprising a wireless communication device configured to wirelessly communicate with other wireless nodes of the tracking system and a plurality of wireless tracking devices, according to some embodiments. The infrastructure node is associated with the location, and each of the wireless tracking devices of the plurality of wireless tracking devices is associated with an asset being tracked by the tracking system. The wireless tracking devices are configured to wirelessly communicate with the infrastructure node when located within a threshold distance of the infrastructure node.

The infrastructure node is configured to determine that a first asset associated with a first wireless tracking device of the plurality of wireless tracking devices is in the location, based on wireless communication between the infrastructure node and the first wireless tracking device. In response to the infrastructure node detecting that the first asset has been removed from the location, the infrastructure node is configured to determine if the removal of the first asset from the location was authorized, based on detected conditions at the time of removal and based on a received first set of rules, the detected conditions including conditions of the first asset and the location. The first set of rules include conditions that correspond to authorized removal of the first asset from the location.

In embodiments, A wireless tracking system leverages client devices in an environment to collaboratively locate assets and track states of assets and infrastructure in the environment.

Tape nodes associated with assets may experience low batteries or environment stressors that cause them to be unable to communicate with gateway nodes, servers, or other infrastructure of the wireless tracking system. A cloud assigns one or more client devices in the environment to locate the asset. Responsive to a client device locating the asset, the client device receives information describing a current state of the asset and transmits the information to the cloud. Based on the information, the tape node may be recovered for recharging or refurbishing.

Infrastructure nodes in environments may additionally experience events impacting their ability to correctly perform actions. For example, gateway nodes may experience low batteries or may experience stress on electronic components due to temperature or other environmental factors. Client devices are leveraged to perform infrastructure testing. When client devices are in range of infrastructure, the client devices may troubleshoot or perform other testing to infrastructure entities, may reconfigure the infrastructure or update one or more settings of the infrastructure, or may flag infrastructure entities as requiring recharging or refurbishing.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

BRIEF DESCRIPTION OF THE DRAWINGS

FIG. 8 is a diagrammatic view of a hierarchical communications network, according to some embodiments.

FIG. 9 is a flow diagram of a method of creating a hierarchical communications network, according to some embodiments.

FIG. 24 is a flowchart for an example method 2401 of using a client device to collect tracking data on assets monitored by associated tracking devices from a drop-off node associated with a drop-off area, according to some embodiments.

FIG. 25 is flowchart for an example method 2501 of using a client device to raise alerts for assets in a wireless tracking system based on tracking data collected from tracking devices associated with the assets, according to some embodiments.

DETAILED DESCRIPTION

Figure 1A:
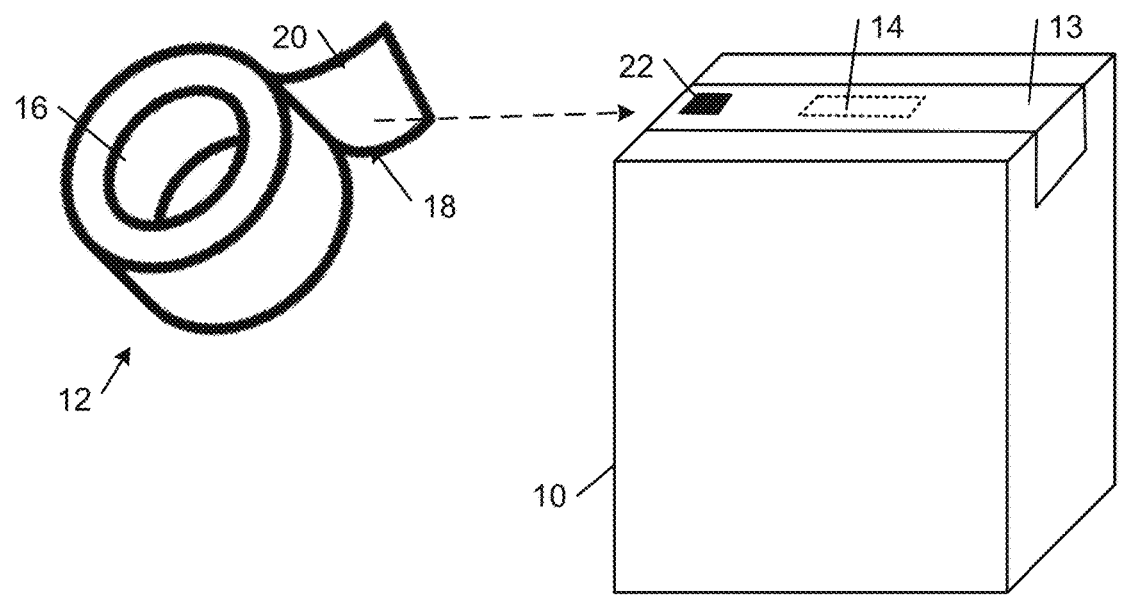
FIG. 1A is a diagrammatic view of an asset that has been sealed for shipment using a segment of an example adhesive tape platform dispensed from a roll, according to some embodiments.

A wireless tracking system leverages client devices in an environment to collaboratively locate assets and track states of assets and infrastructure in the environment.

Wireless IOT devices associated with assets may experience low batteries or environment stressors that cause them to be unable to communicate with gateway nodes, servers, or other infrastructure of the wireless tracking system. A cloud assigns one or more client devices in the environment to locate the asset. Responsive to a client device locating the asset, the client device receives information describing a current state of the asset and transmits the information to the cloud. Based on the information, the wireless IOT device may be recovered for recharging or refurbishing.

The wireless tracking system includes one or more infrastructure nodes, which are wireless nodes that are associated with a location or a piece of infrastructure in an area. An infrastructure node includes wireless nodes (tape nodes, gateway devices, etc.) that are configured to wirelessly communicate with other wireless nodes of the tracking system within a specified area, location, environment or region. The infrastructure node may provide resources and perform tasks that are delegated to the infrastructure node from a server of the wireless tracking system or from a wireless node that is in the associated location. An infrastructure node, for example, may perform a computational task on behalf of a tape node in its associated location that is deemed too expensive, in terms of battery life, for the tape node to perform itself. The infrastructure node may perform the computational task and return a result to the tape node. An infrastructure node may be battery powered, draw power from an electrical line, or use energy harvesting (e.g., solar energy harvesting), but is not limited to such embodiments.

Infrastructure nodes for the wireless tracking system in environments may additionally experience events impacting their ability to correctly perform actions. For example, gateway nodes may experience low batteries or may experience stress on electronic components due to temperature or other environmental factors. Client devices are leveraged to perform infrastructure testing. When client devices are in range of infrastructure, the client devices may troubleshoot or perform other testing to infrastructure entities, may reconfigure the infrastructure or update one or more settings of the infrastructure, or may flag infrastructure entities as requiring recharging or refurbishing.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or "peripheral" wireless node, also referred to as an outer node, leaf node, or terminal node, refers to a node that does not have any child nodes.

In some instances, a "wireless node" may refer to a node or wireless device of the wireless tracking system that is not an adhesive tape platform. For example, a wireless node, in some embodiments, may have a form factor that is not flexible or may not include an adhesive, but may include some, if not all, of the same components as the tape node shown in FIG. 3. A wireless node may include a wireless communication device such as an adhesive tape platform, a battery-powered gateway device, a line-powered gateway device, a user client device (e.g., a smartphone), a wireless communication device with a rigid form factor, or some other wireless communication device configured to wirelessly communicate in an IOT network. A wireless node, in some embodiments, may include a processor, memory and/or storage, and software that allows the wireless node to operate as an intelligent agent according to distributed agent operating system, as described below, in further detail.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

INTRODUCTION

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
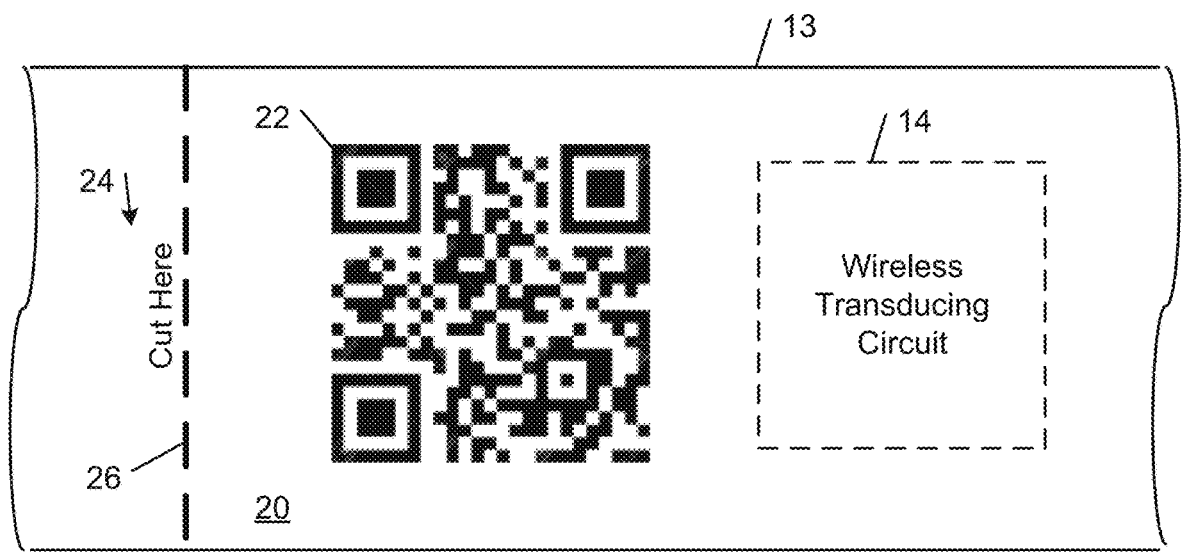
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
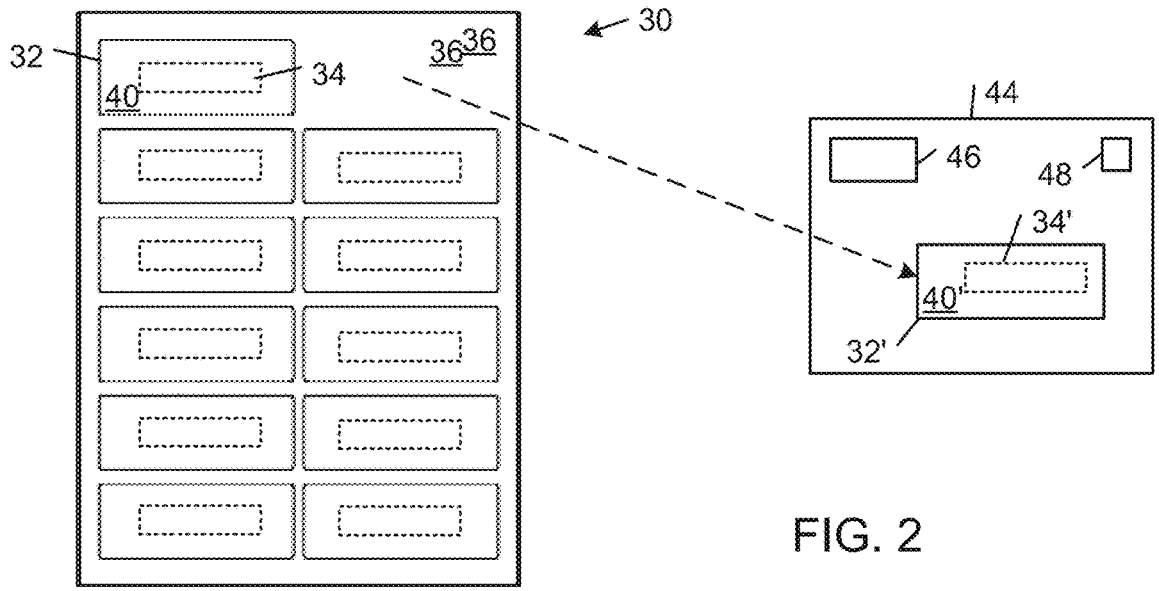
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
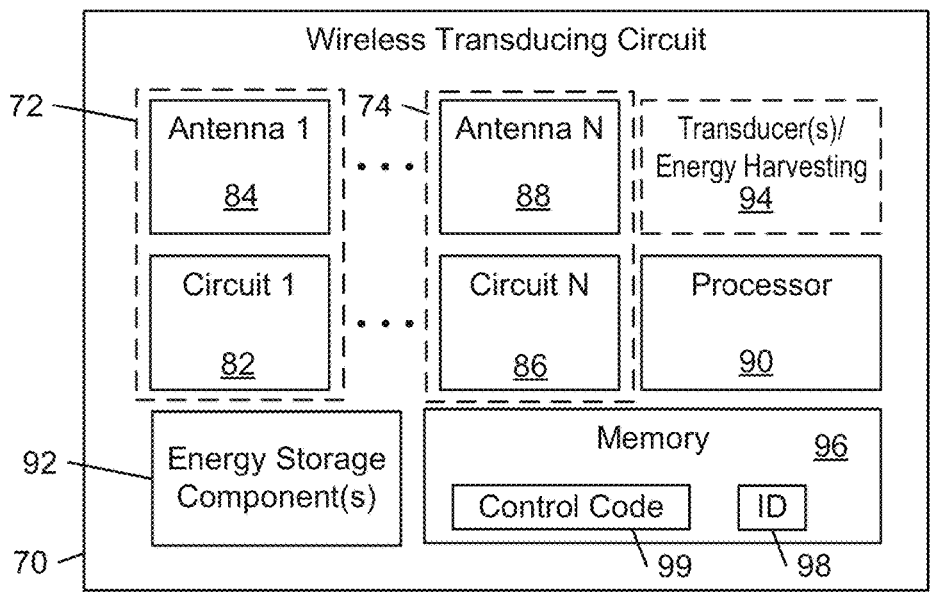
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
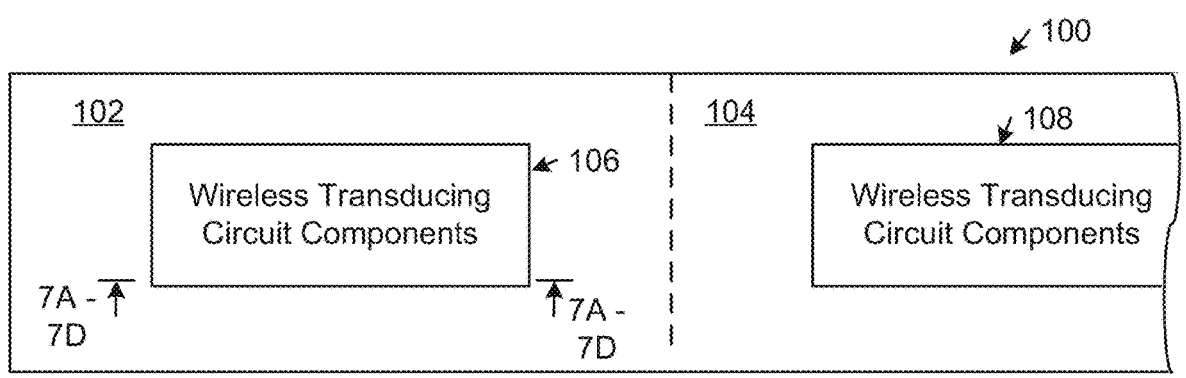
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
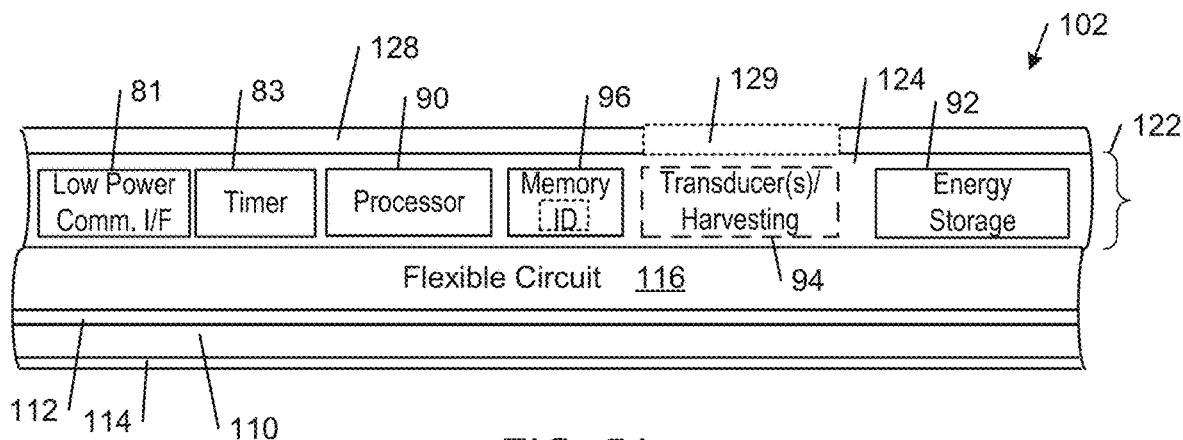
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
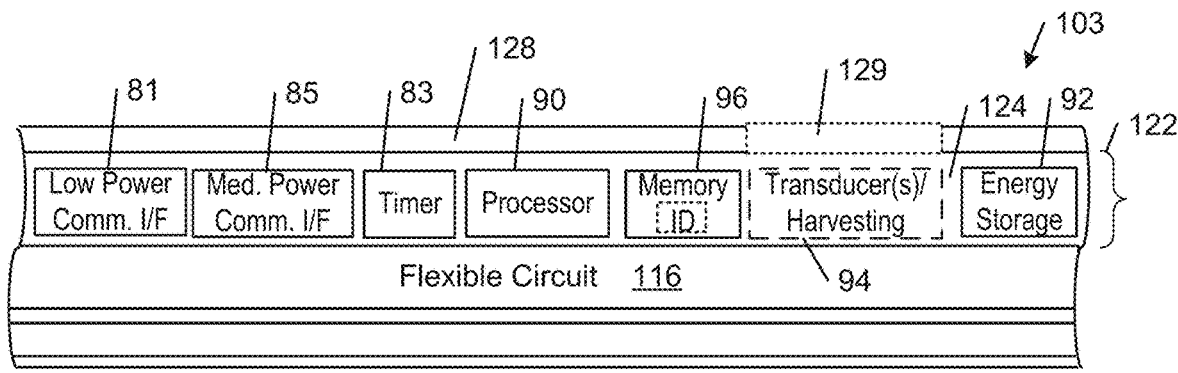

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
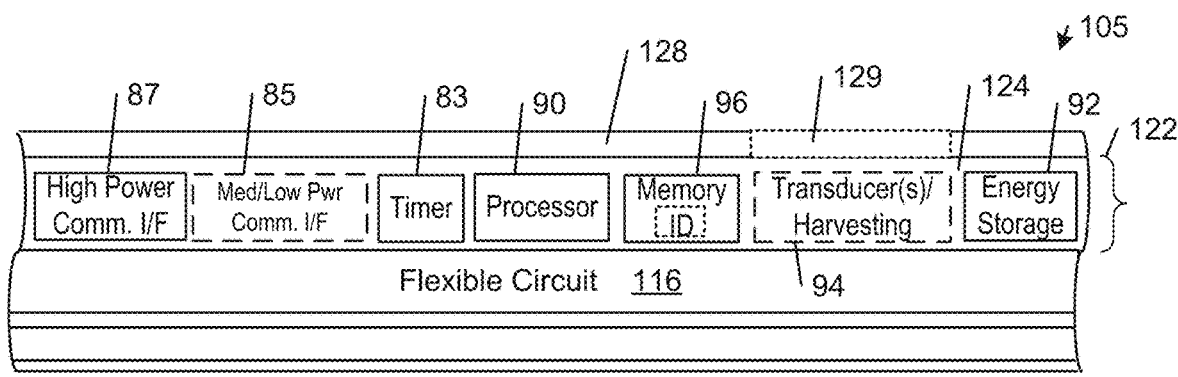

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
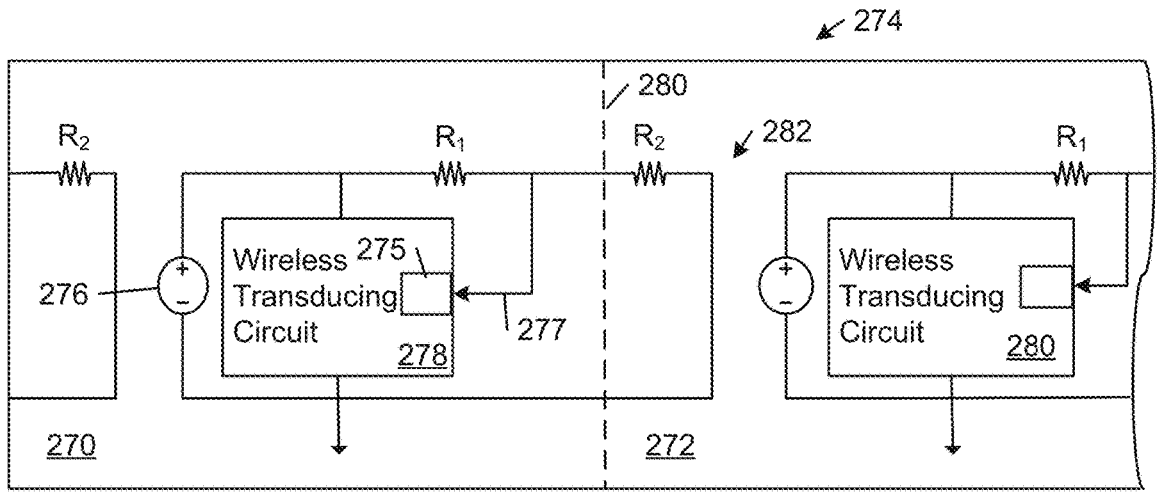
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
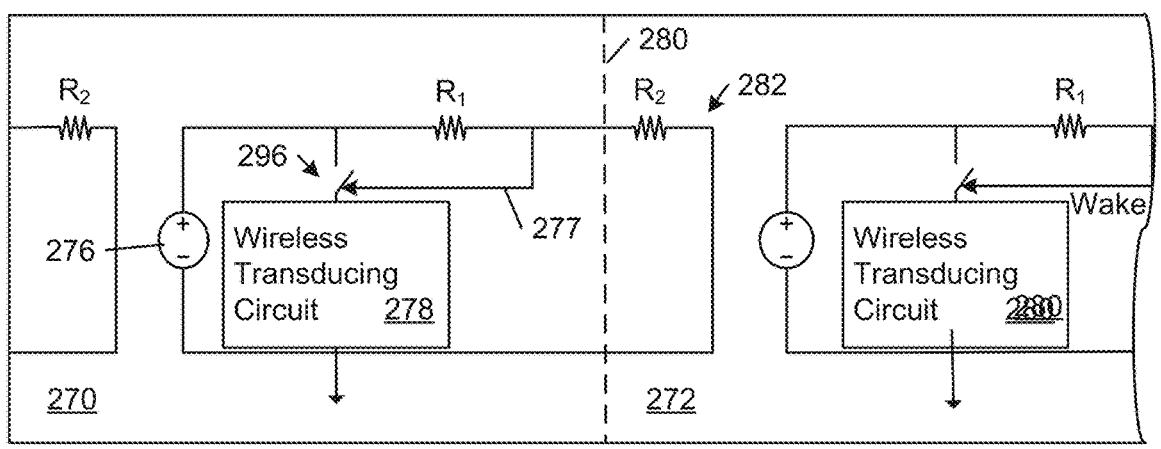

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
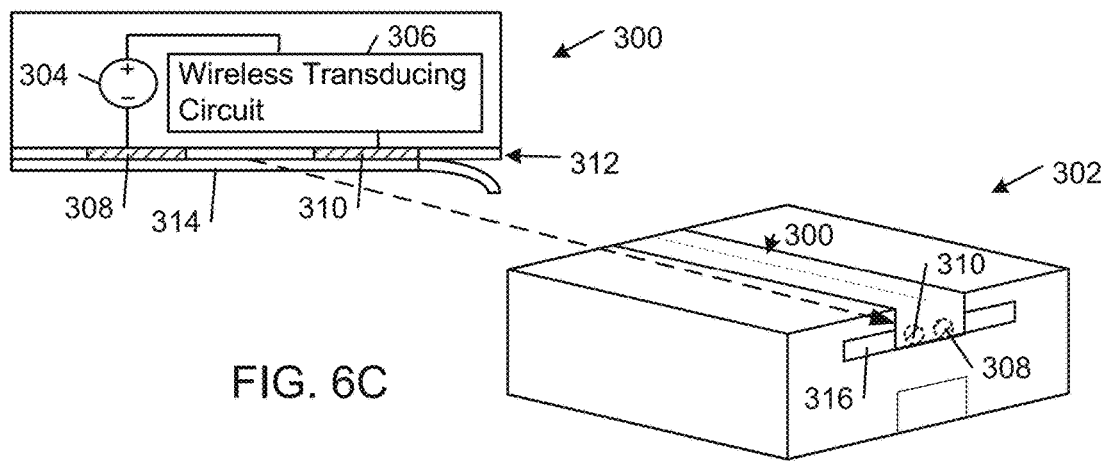
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
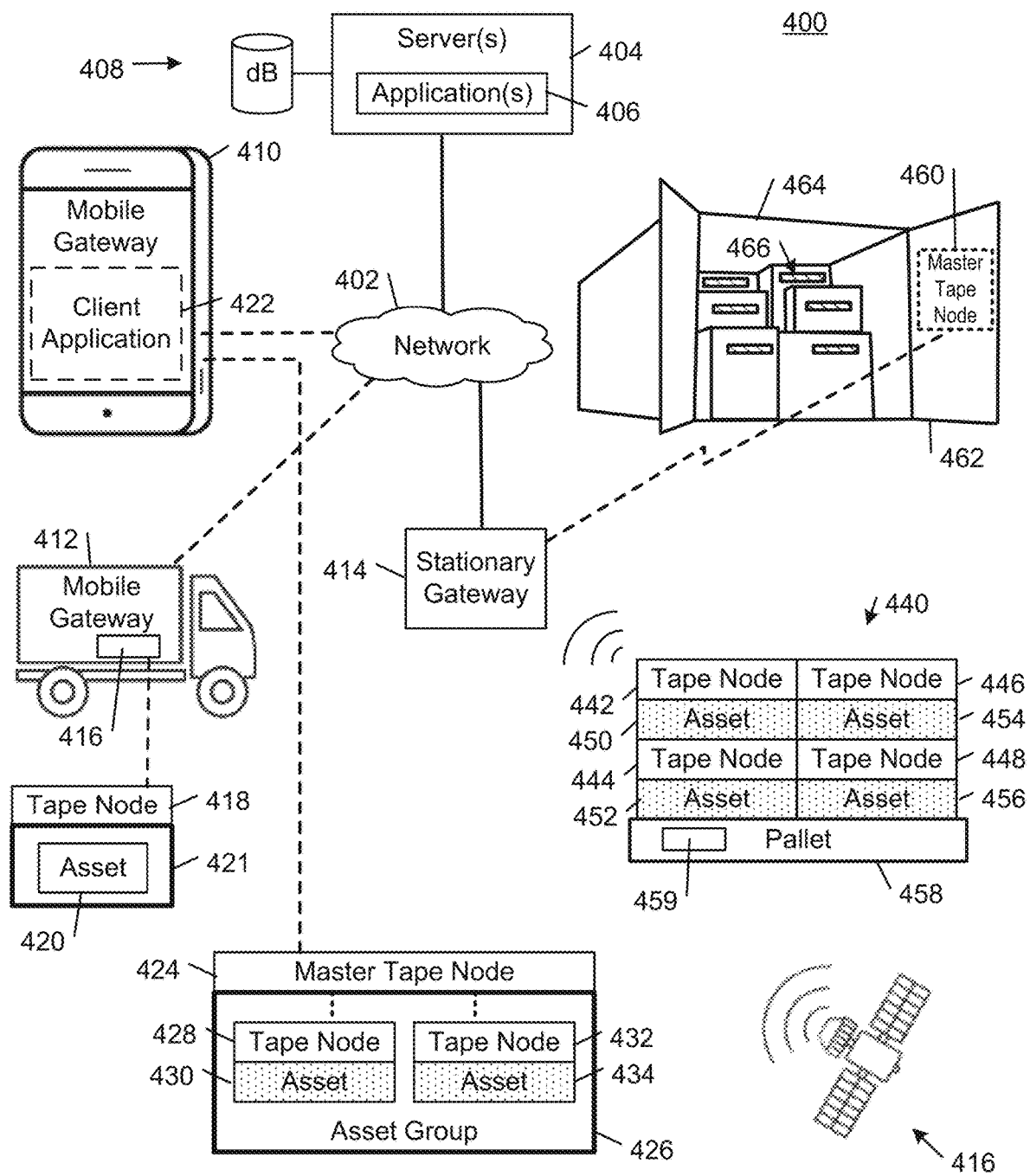
FIG. 7 is a diagrammatic view of an example of a network environment supporting communications with segments of an adhesive tape platform, according to some embodiments.

FIG. 7 shows an example network communications environment 400 (also referred to herein as an "TOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol or a satellite communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
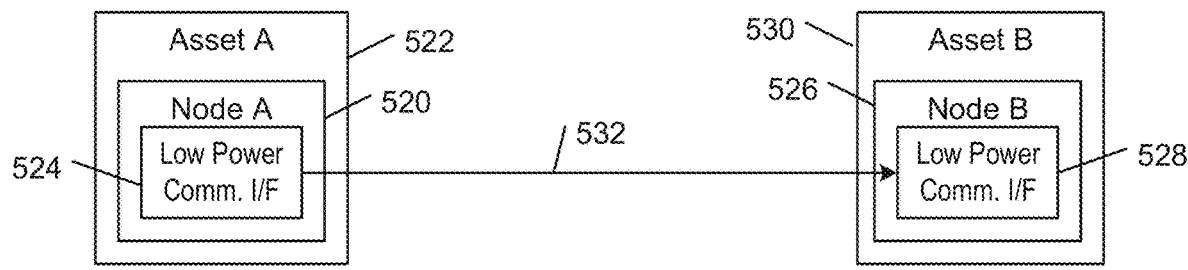
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
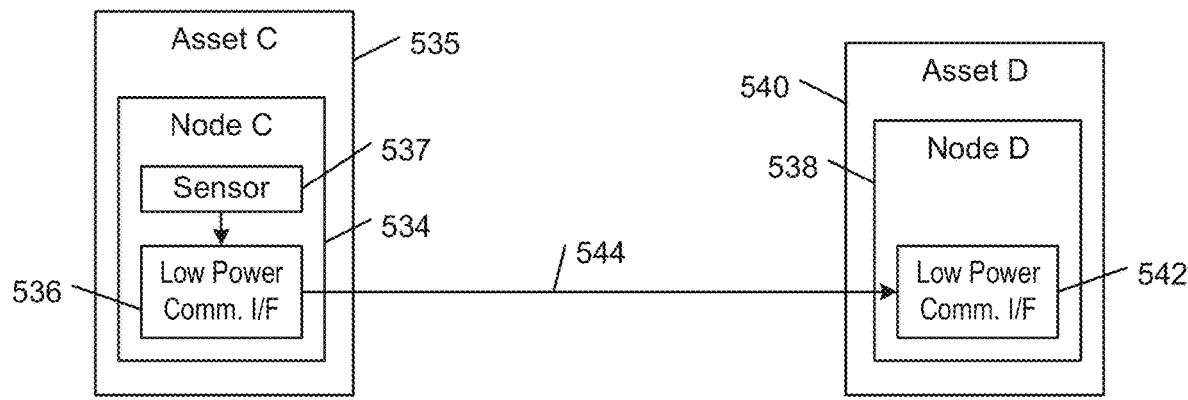

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
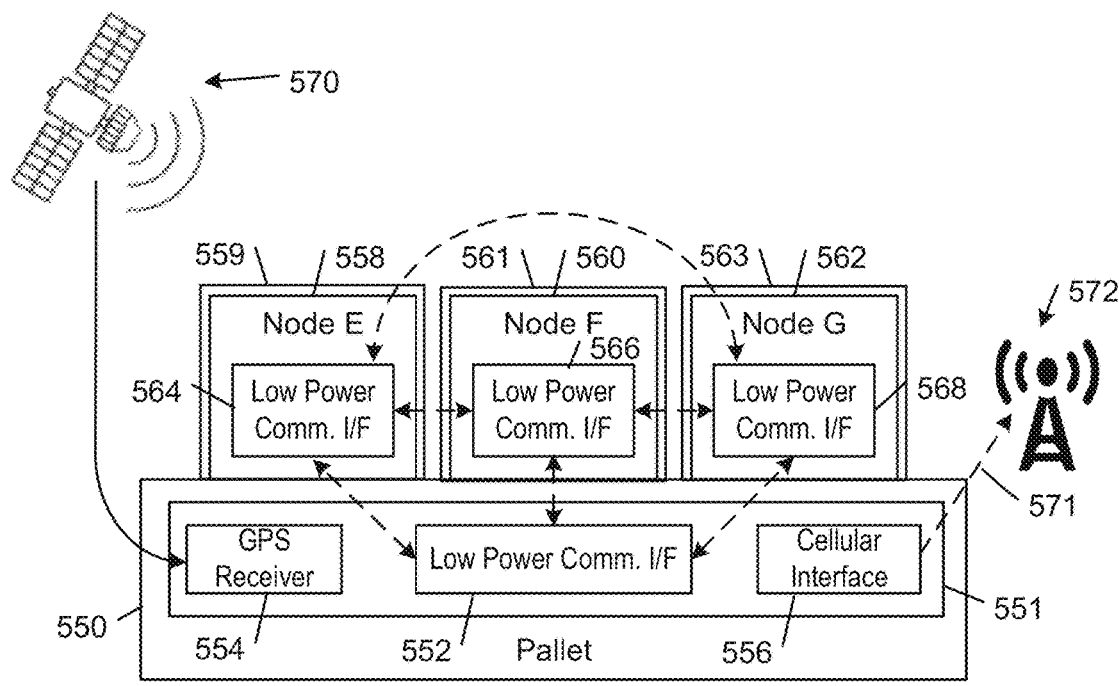

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
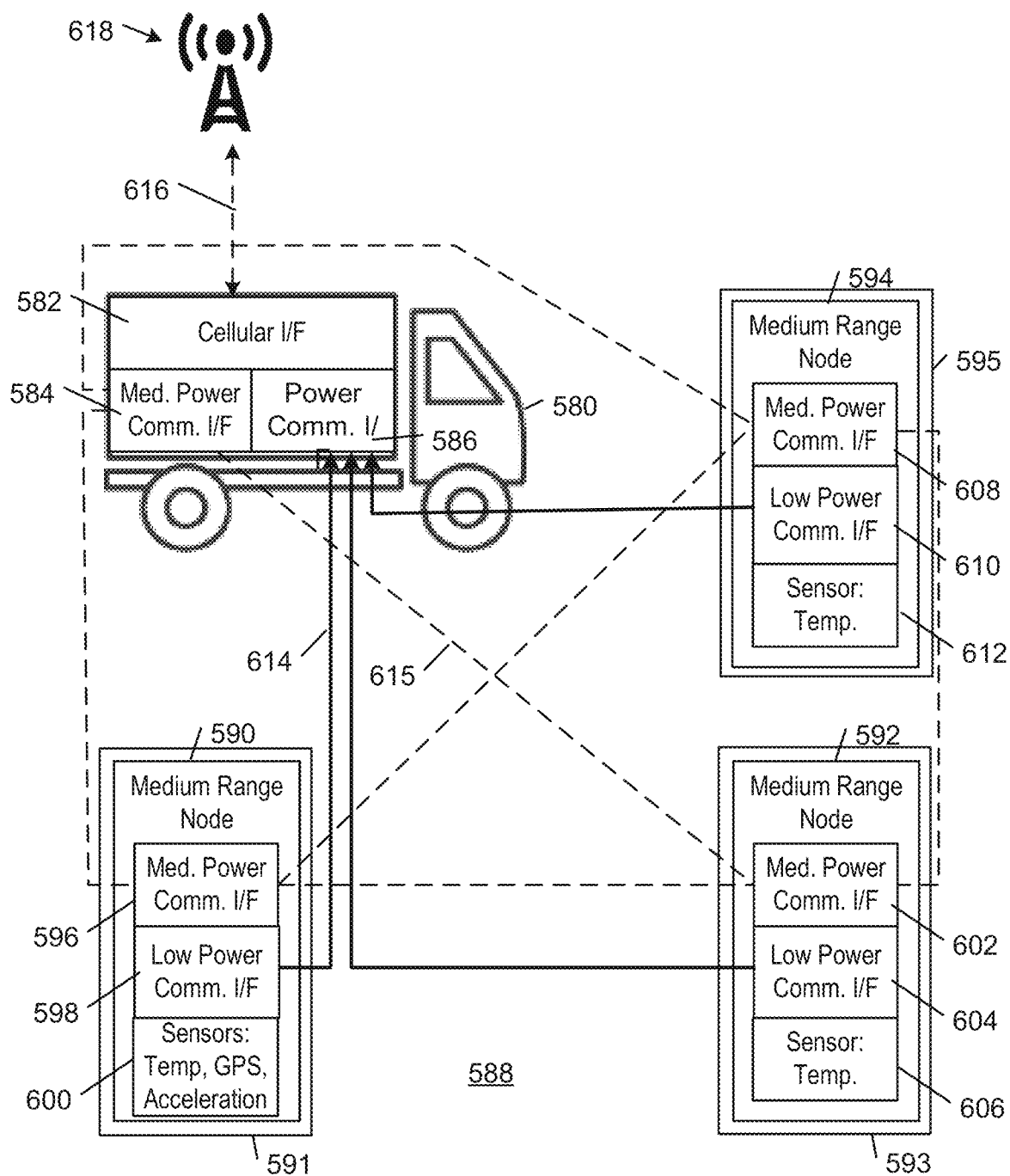

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
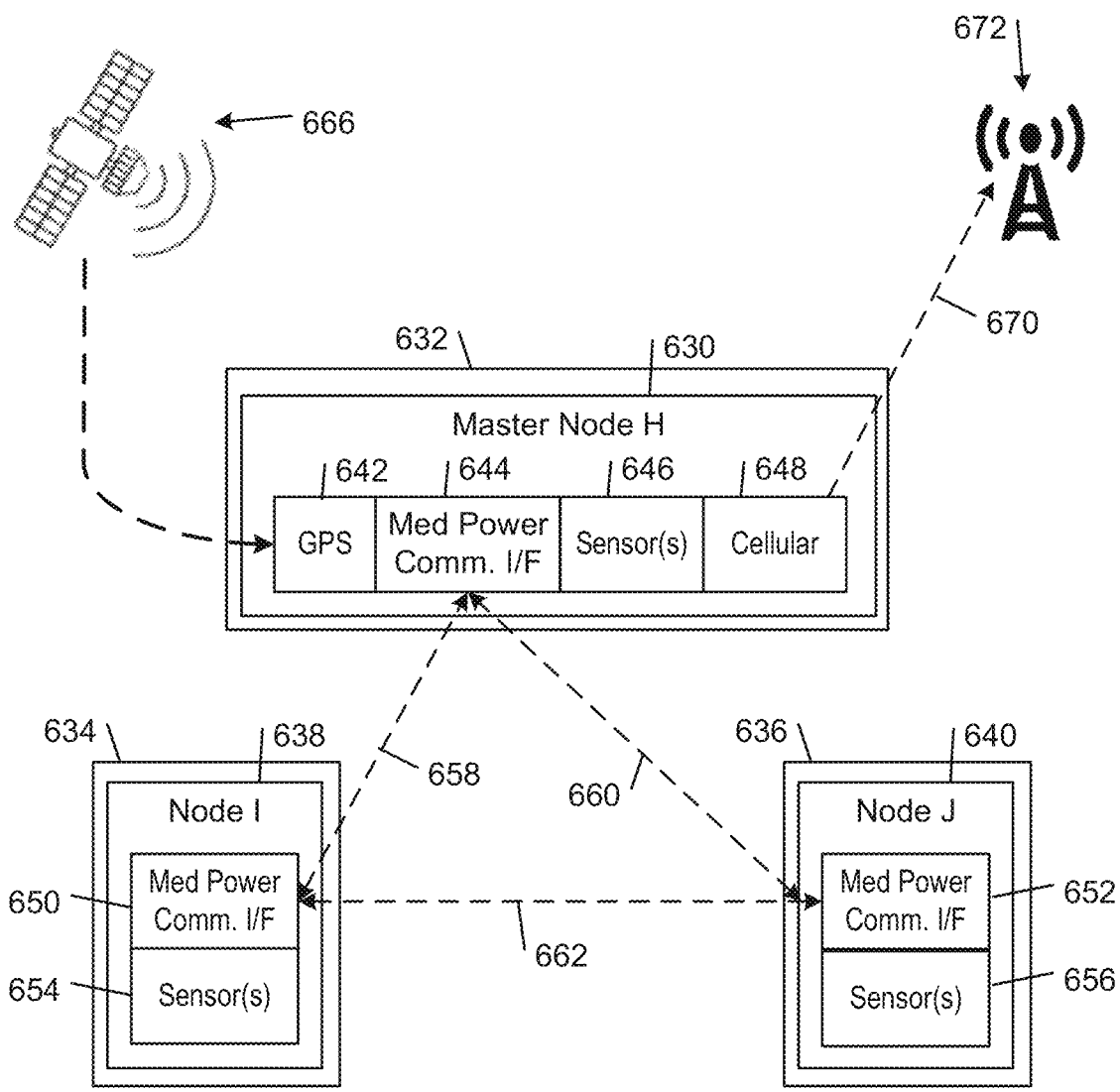

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630, 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Locating of Assets and Infrastructure Testing Using Client Devices

In environments with large numbers of assets, tracking devices may be used to track the assets. If the tracking devices running out of battery or experiencing anomalous conditions affecting ability to communicate effectively, assets may become "lost" or unable to be located. Further, in large environments, it is often difficult to test infrastructure throughout the system. The wireless tracking system 400 leverages client devices in an environment to collaboratively locate assets and track states of assets and infrastructure nodes in the environment. Each of the tracking devices is a wireless tracking device included in the wireless tracking system 400 that is configured to wirelessly communicate (e.g., using Bluetooth, LoRa, cellular communications, WiFi, or some other wireless communication system) with one or more other members of the wireless tracking system 400. In some embodiments, the tracking device is a tape node.

Tracking devices associated with assets may experience low batteries or environment stressors that cause them to be unable to communicate with gateway nodes, servers, or other infrastructure of the wireless tracking system 400. A system controller of the wireless tracking system assigns one or more client devices in the environment a role to locate the asset. The system controller is a module of the wireless tracking system configured to interact and communicate with the tracking devices in order to track the locations and conditions of the assets. The system controller may include one or more programs or applications that the system controller executes, according to some embodiments. The system controller may provide instructions to the client devices to locate the asset using capabilities and communication systems of the client devices. Responsive to a client device locating the asset, the client device receives information describing a current state of the asset and transmits the information including the location of the asset to the system controller. Based on the information, the tracking device may be recovered for recharging or refurbishing.

In some embodiments, the system controller may be stored and/or executed from the cloud or server(s) of the wireless tracking system 400, according to some embodiments. In other embodiments, the system controller may be stored and/or distributed among one or more of the cloud, server(s) of the wireless tracking system 400, and one or more other client devices or entities.

In some embodiments, the system controller of the wireless tracking system accesses a database comprising entries describing assets in an environment. In some embodiments, the database is stored on a server of the wireless tracking system 400. For example, the system controller may access the database at periodic intervals, e.g., once a day, or responsive to events occurring, e.g., after unloading or loading events occur in the environment. The database entries describe assets in the environment having associated tape nodes or other tracking devices associated with the assets, and may be used to confirm that all assets in the environment are accounted for and/or have known locations and correctly functioning tracking devices. For example, the system controller confirms that tracking devices corresponding to the assets have provided a heartbeat signal, location data, or other communication within a past period of time, e.g., within the past 24 hours, within the past 1 hour. If a tracking device corresponding to an asset has failed to provide a heartbeat signal, location data, or other communication and is nonresponsive or responds abnormally to a request for information, the system controller of the wireless tracking system identifies the asset as lost or requiring action. The system controller may determine that the asset is lost in response to a threshold period of time elapsing without receiving a communication from the tracking device.

In other embodiments, the system controller of the wireless tracking system may receive requests from users of the wireless tracking system to locate assets in the environment. A user may issue the request in response to the user determining that the asset is lost. In some embodiments, the request is issued automatically by the wireless tracking system in response to the user indicating that a last received location of a tracking device from the wireless tracking system 400 corresponding to an asset does not match an actual location of the tracking device and the asset. In some cases, the wireless tracking system detects that the tracking device is unresponsive to communication attempts or is responding abnormally to a request for information, and the system controller of the wireless tracking system determines that the asset is lost or requiring action.

In other embodiments, other actions or events may cause the system controller of the wireless tracking system to identify an asset as lost or requiring action. For example, in embodiments wherein tracking devices in the environment transmit periodic or scheduled communications (e.g., heartbeat signals), the system controller of the wireless tracking system may identify an asset as lost or requiring action responsive to a corresponding tracking device failing to transmit the periodic or scheduled communication.

Responsive to identifying an asset as lost or requiring action, the system controller selects a set of one or more client devices in the environment to perform a search for the asset. In some embodiments, client devices in the environment eligible for selection to perform the search communicate with the infrastructure via an application, API, or other interface on the client device. The application is, for example, enabled to perform background tasks or actions, such that users of the client device may not be required to monitor or actively participate in a search for lost assets, or may receive notifications from the system controller via the application to initiate an active search for lost assets. In some embodiments, client devices in the environment eligible for selection to perform the search additionally have one or more communications systems or capabilities enabled, e.g., Bluetooth or other short-range communications. In some embodiments, the client device is a smartphone.

The system controller may select the set of one or more client devices based at least partially on a location of each client device, according to some embodiments. In further embodiments, the system controller selects available client devices that are in proximity to a last known location or a predicted location of the lost asset. For example, the system controller may select all available client devices that are within a threshold distance from the last known location or the predicted location of the lost asset. In another example, the system controller may select a predetermined number of available client devices that are closest to the last known location nor the predicted location.

In other embodiments, the system controller selects the set of one or more client devices based on a search area. The search area is an area or region where one or more client devices will search in order to find the lost asset. The search area may be determined based on one or more of, for example, a last known location of the lost asset, a known flow of traffic in an environment, an expected location of the lost asset, and the like. The system controller selects a predetermined number of available client devices located in the search area, according to some embodiments. In other embodiments, the system controller selects all available client devices located in the search area. In some embodiments, the system controller selects client devices that are not in the search area but are located nearby the search area.

In some embodiments, the system controller of the wireless tracking system selects a random or pseudo-random set of client devices in the environment to perform the search, e.g., by randomly determining for each client device in the environment whether to perform the search, or randomly selecting a set number of client devices in the environment to perform the search. In other embodiments, the system controller of the wireless tracking system selects client devices in the environment to perform the search based at least in part on location data associated with the client devices. For example, a set of client devices may be selected such that current locations of the client devices are distributed evenly throughout the environment, such that all areas of the environment are likely to be searched.

In another example, a set of client devices may be selected such that current locations of the client devices represent each area of a plurality of areas in the environment, e.g., one client device is selected per room or zone of the environment. In another example, a set of client devices may be selected based on client devices closest to a last known location of an asset. In other examples, one or more factors may additionally or instead be used to select the set of client devices to perform the search, such as one or more of: a current activity or action being performed by a client device; a current status of a user of the client device; a current activity being performed by the client device; a role, rank, or identifier of the client device; a historic compliance by a user of the client device to perform an active search; other factors; or some combination thereof.

In some embodiments, client devices associated with one or more specified active tasks cannot be selected by the system controller of the wireless tracking system to initiate a search for a lost asset. For example, client devices associated with an active search for a different lost asset cannot be selected by the system controller to initiate a second simultaneous search for a second lost asset. In another example, client devices having an active task such as, e.g., loading or unloading other assets or moving cold supply chain assets to a refrigerated area cannot be selected by the system controller to initiate a search for a lost asset. In other examples, other active tasks may cause a client device to be unable to be selected by the system controller to begin a search for a lost asset. The system controller is configured to determine which client devices are available for a task.

Figure 11A:
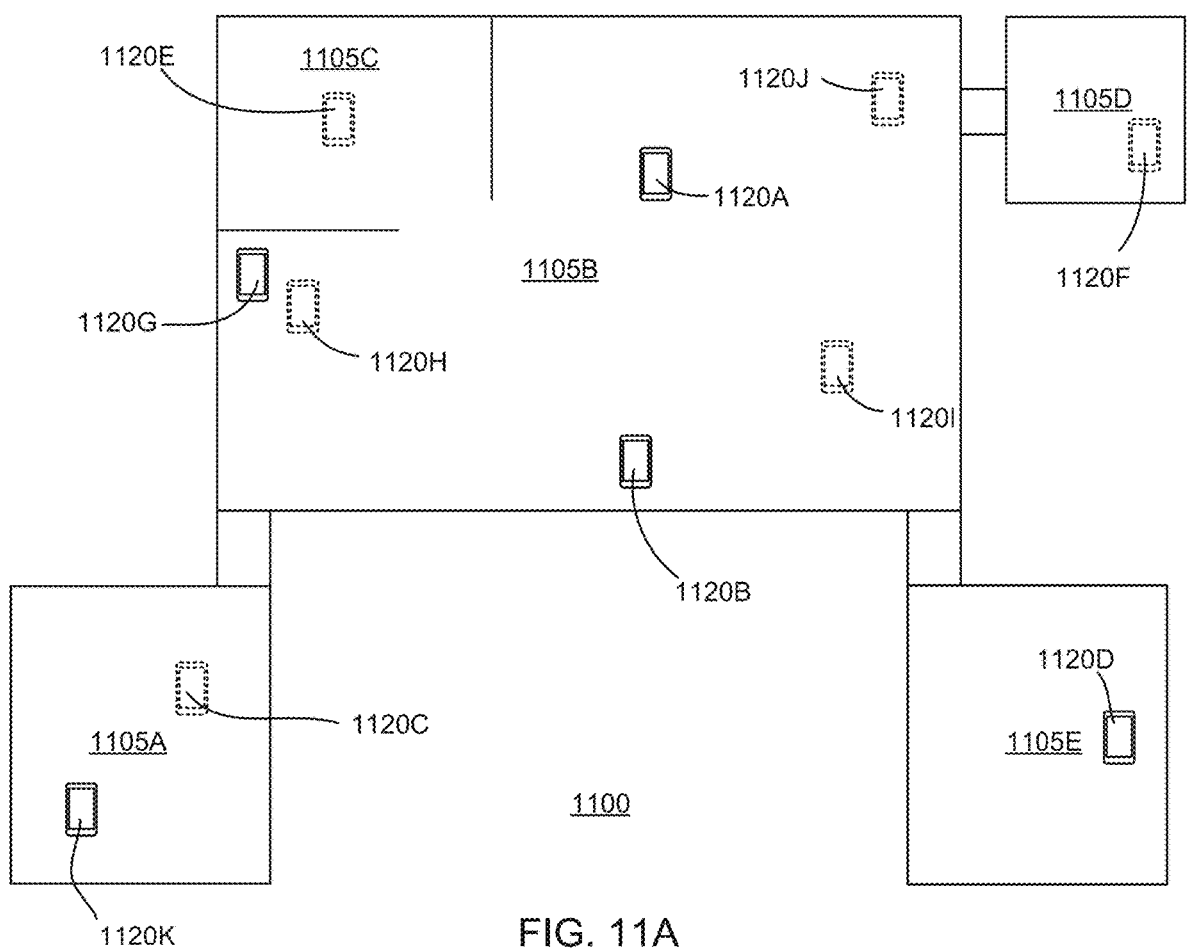
FIGS. 11A-11C are diagrammatic views illustrating client devices being selected to perform locating of assets and/or infrastructure testing in an environment.
Figure 11B:
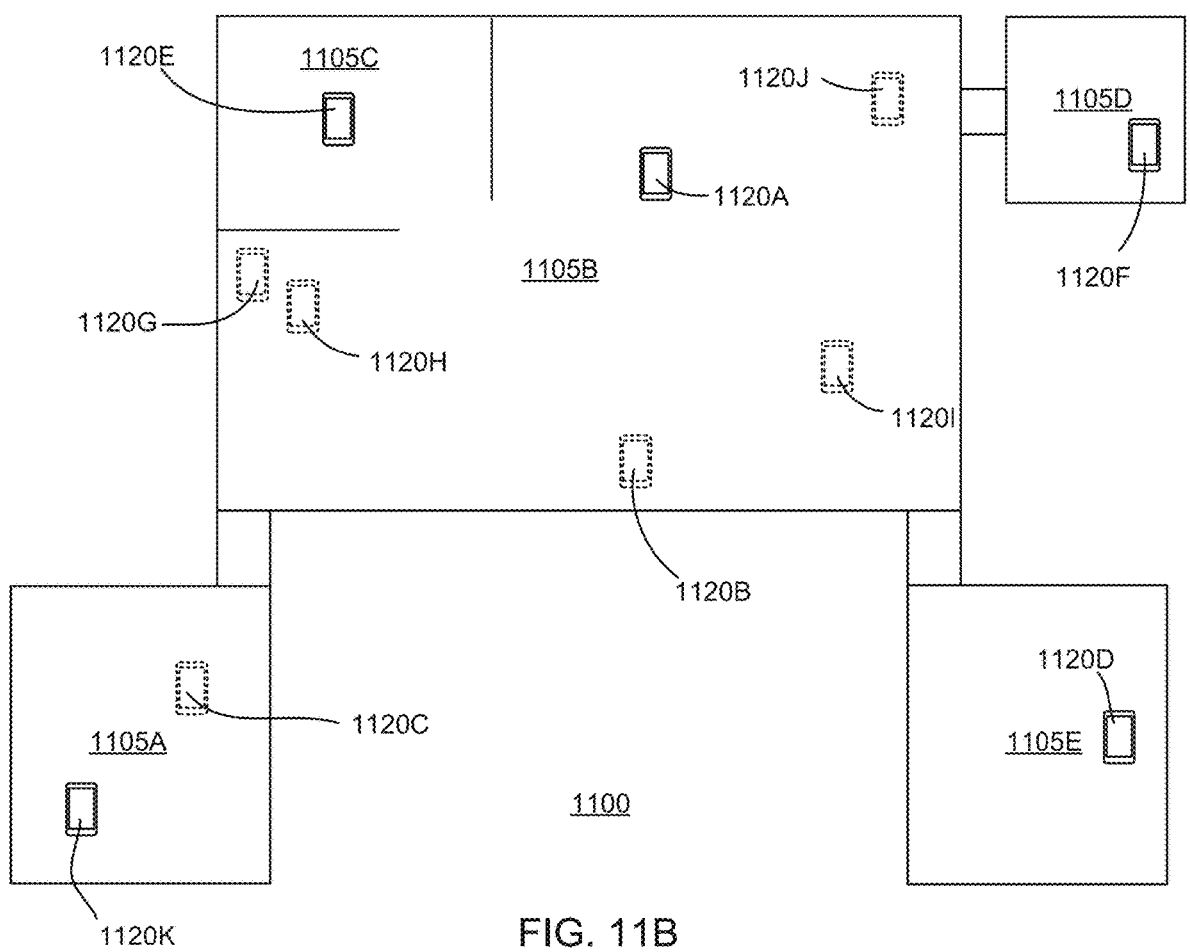
Figure 11C:
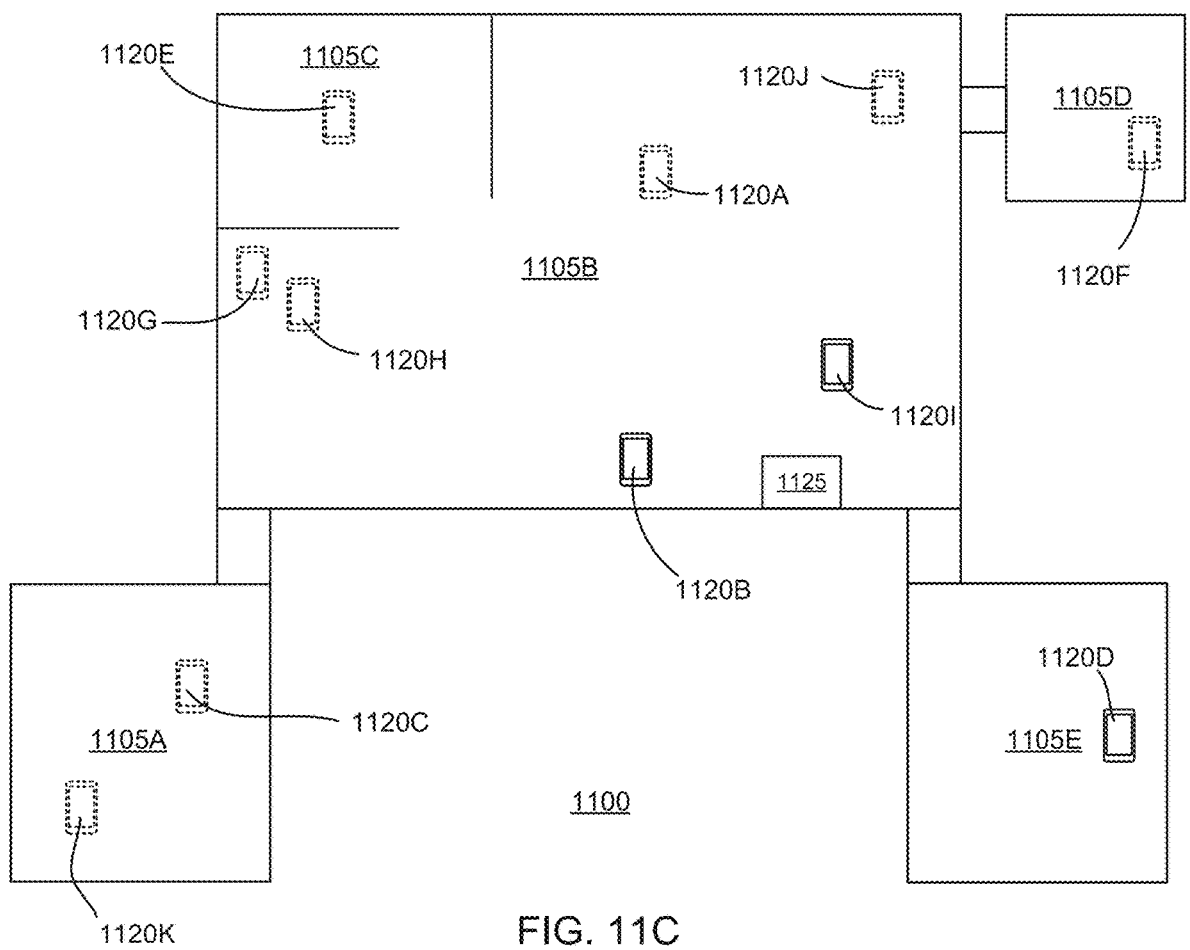

FIGS. 11A-11C are diagrammatic views illustrating client devices 1120 being selected to perform locating of assets and/or infrastructure testing in an environment 1100. The set of selected client devices is illustrated in FIGS. 11A-11C by client devices having solid lines, while client devices in the environment not selected are illustrated by client devices having dashed or dotted lines.

FIG. 11A illustrates a plurality of client devices 1120A-1120K distributed in an environment 1100, the environment having a plurality of rooms or areas 1105A-1105E. A set of client devices 1105A, 1105B, 1105D, 1105G, 1105K is selected to perform a search via a random or pseudo-random selection process. As such, the set of selected client devices is randomly scattered through the environment 1100.

FIG. 11B illustrates the environment described in FIG. 11A, wherein a plurality of client devices 1120A-1120K are distributed in an environment 1100 having a plurality of rooms or areas 1105A-1105E. In the example of FIG. 11B, a set of client devices 1120A, 1120D, 1120E, 1120F, 1120K is selected to perform the search based on current locations of the client devices. For example, the client devices 1120A, 1120D, 1120E, 1120F, 1120K are selected such that each room or area 1105A-1105E of the environment 1100 is represented by a client device in the set of selected client devices. As such, a search performed by the set of client devices 1120A, 1120D, 1120E, 1120F, 1120K is more likely to encompass each room or area 1105A-1105E of the environment 1100. In another example, the client devices 1120A, 1120D, 1120E, 1120F, 1120K are selected such that they are evenly distributed across the environment 1100.

FIG. 11C illustrates the environment described in FIG. 11A, wherein a plurality of client devices 1120A-1120K are distributed in an environment 1100 having a plurality of rooms or areas 1105A-1105E. In the example of FIG. 11C, the wireless tracking system performs a search for an asset or node 1125 having a known location or last known location. For example, the node 1125 may be a gateway node providing abnormal data or scheduled for testing. In another example, the node 1125 may be a tracking device associated with an asset having provided a last known location prior to becoming nonresponsive. A set of client devices 1120B, 1120D, 1120I are selected to perform a search for the node 1125 based on client devices in the environment having a current location closest to the known location or last known location of the node 1125, such that a search is likely to be quicker and will not require other users to travel across the environment 1100 to access the node.

In some embodiments, responsive to being selected to perform a search for a lost asset, a client device initiates a search mode. The search mode may, for example, scan for tracking devices using a wireless communication system of the client device that the lost asset's corresponding wireless tracking device is configured to connect with within a threshold area at a high frequency (e.g., every 30 seconds, every 1 minute) while the search is being performed.

In some embodiments, wireless tracking devices are associated with one or more communications systems, as described in conjunction with FIG. 3. The one or more communications systems may include, for example, Bluetooth, Wi-Fi, and/or cellular communications systems. The client device in search mode performs a search via at least one communication system compatible with the tracking device, e.g., broadcasts a Bluetooth signal to connect to the wireless tracking device. In some embodiments, client devices may be equipped with one or more different communications systems than those listed above, such as RF (e.g., LoRa), and may perform a search via the one or more different communications systems. The systems controller may select a client device to perform a search based at least in part on the client device having a particular communications system.

In some embodiments, the client device performing the search may broadcast a signal comprising information such as an identifier (e.g., UID, mac address, or other identifier) of the wireless tracking device. The wireless tracking device is configured to receive the broadcasted signal and connect with the client device to provide data relevant to the associated asset. In some embodiments, the wireless tracking device may temporarily disable one or more communications system, e.g., while in a hibernation or low battery mode. In this case, the wireless tracking device may be configured to periodically activate a communication system for a brief period of time to search for the broadcasted signal by the client device to enable the wireless tracking device to detect a communication attempt and initiate a communication connection accordingly. If no broadcasted signal from a client device is received in the brief period of time, the wireless tracking device may then disable the one or more communication systems, until the next scheduled time to check for a broadcasted signal. In further embodiments, upon receiving the broadcasted signal, which may be a wake signal, the wireless tracking device may exit the hibernation or low battery mode and increase the functionality of the wireless tracking device (e.g., activating communication systems, performing energy-consuming functions, activate sensors, etc.). In some embodiments, wireless tracking devices may detect that they are lost and initiate or activate one or more communications systems to search for a client device. For example, wireless tracking devices may detect that they are lost based on failure to receive a scheduled communication or ping; failure to deliver a scheduled communication, ping, or heartbeat signal; loss of one or more functionalities (e.g., inability to perform locating); captured sensor data reflecting an unusual or anomalous environment (e.g., abnormally high temperatures for a cold chain asset); and the like. By initiating or activating one or more communications systems to search for a client device, wireless tracking devices ensure that they are receptive to communications attempts by searching client devices.

Responsive to the client device detecting a tracking device associated with the lost asset within the threshold area, the client device establishes a communication connection with the tracking device and receives information describing a current state of the tracking device. For example, the client device receives information describing one or more events having occurred to the asset (e.g., entering a low battery state, loading or unloading, abnormal temperature or other sensor data, tampering events, and the like) and determines, based on the information, whether the tracking device requires refurbishing or recharging. Refurbishing, wherein one or more components of a tracking device is identified as malfunctioning, dead, or entering an end-of-life condition are replaced, may be caused by a number of factors, such as abnormal conditions during transportation or storage causing one or more components to malfunction or to experience unexpected levels of stress and usage, physical damage to the one or more components, and the like. In some embodiments, the received information may comprise current location or sensor information, a current battery level, and the like. The client device transmits the received information and the determination about whether the tracking device requires refurbishing or recharging to the system controller of the wireless tracking system.

In some embodiments, the client device communicates with the system controller using a different wireless communication system than it uses to communicate with the wireless tracking device associated with the lost assets. For example, the client device may communicate with the associated wireless tracking device using Bluetooth, while the client device communicates with the system controller or the wireless tracking system 400 using cellular communications or WiFi.

In other embodiments, the client device may additionally or instead transmit the received information and the determination to other entities of the wireless tracking system. For example, the client device may additionally or instead transmit the received information and the determination to a gateway node or master node in the environment, a server of the wireless tracking system, or one or more other client devices of the wireless tracking system. In other embodiments, the client device may transmit the received information to the system controller or another entity of the wireless tracking system, and the determination about whether the tracking device requires refurbishing or recharging may be performed by the system controller or other entity.

In some embodiments, responsive to the determination or instructions from the system controller or another entity of the wireless tracking system, the client device may transmit instructions to the tracking device to update or change one or more settings or parameters of the tracking device. For example, the client device may transmit instructions to the tracking device to modify a scheduled time for transmitting heartbeat signals or communicating updates to the system controller or infrastructure of the wireless tracking system. In another example, the client device may transmit instructions to the tracking device to use a particular communications system or to stop using a particular communications system. In another example, the client device may transmit instructions to the tracking device to recalibrate one or more sensors receiving abnormal readings.

In embodiments where an energy storage component of the tracking device is dead and a communication connection cannot be established, an active or manual search may be required. During active or manual searches, users of client devices may be assigned to search in a specified zone or area, so as to ensure that there is minimal overlap in search zones. In some embodiments, active or manual searches may be performed on a voluntary basis. For example, the system controller transmits a request to all client devices within an environment to initiate an active or manual search. The search is initiated responsive to a user of the client device transmitting acceptance of the request to the system controller. During active or manual searches, a client device successfully locates a lost asset responsive to a user of the client device scanning a barcode, such as a QR code, or other unique identifier of the asset with the client device. The client device relays information describing a location of the scanned asset to the system controller of the wireless tracking system.

Responsive to receiving information about a lost asset from a client device, the system controller of the wireless tracking system determines that the lost asset has been found. The system controller of the wireless tracking system transmits an instruction to the set of client devices performing the search to terminate the search for the lost asset. The termination instruction instructs the set of client devices to exit the search mode, if active, and to resume normal operation. The system controller may additionally transmit one or more additional instructions to client devices in the environment to perform an action on the asset, e.g., an instruction for a user of a client device to initiate refurbishment or recharging of the tracking device, an instruction for a user of a client device to transport the asset to a specified location or area, and the like.

Figure 12:
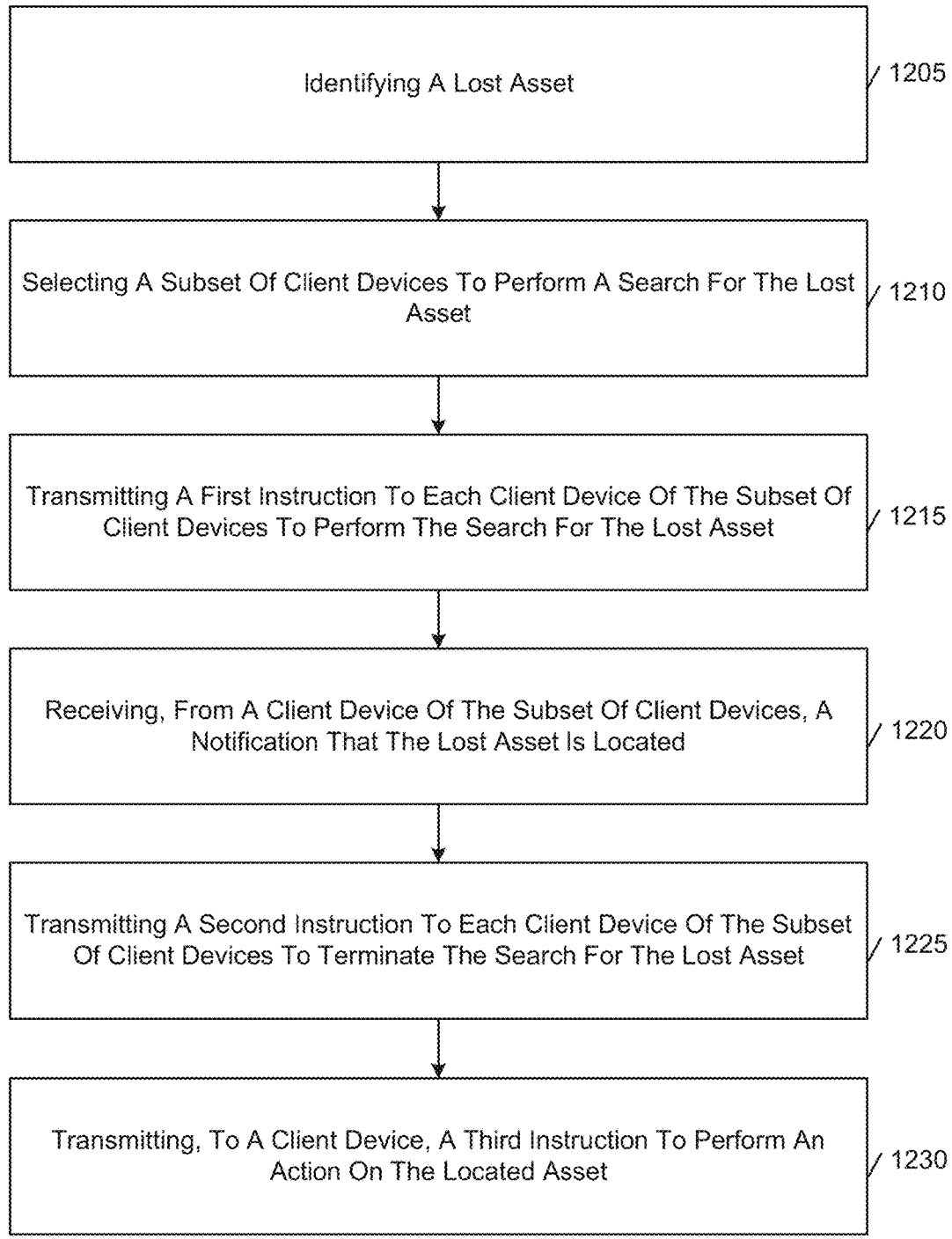
FIG. 12 is a flow diagram of a method for selecting client devices for performing locating of assets and/or infrastructure testing.

FIG. 12 is a flow diagram of a method 1201 for selecting client devices for performing locating of assets and/or infrastructure testing. A system controller of a wireless tracking system identifies 1205 a lost asset. As previously described, the identification may be performed responsive to a user of the wireless tracking system manually submitting an asset as lost, a tracking device failing to perform a periodic or scheduled heartbeat signal or other transmission, a tracking device failing to respond to a request for information, and the like. The system controller selects 1210 a subset of client devices to perform a search for the lost asset. As shown in FIGS. 11A-11C, the selection may be performed randomly or pseudo-randomly, or may be based at least in part on one or more other factors, such as locations of the client devices in the environment, a last known location of the lost asset, and other information. The system controller transmits 1215 a first instruction to each client device of the selected subset of client devices to perform the search for the lost asset.

In some embodiments, selection of client devices for locating lost assets may be dynamic over time. For example, responsive to a threshold amount of time passing without the lost asset being located, the system controller may assign additional client devices to search for the lost asset. In another example, the system controller may remove one or more selected client devices from the search responsive to the client devices exiting the environment, being stationary for more than a threshold amount of time, entering a busy or hibernation mode, entering a zone in which a plurality of other client devices are searching, and the like.

In some embodiments, the system controller may select a client device to perform multiple searches for different assets simultaneously. In other embodiments, each client device is limited to search for a single asset at a time, and may be removed or reassigned to different assets during searches.

The system controller receives 1220 a notification from a client device of the subset of client devices that the lost asset is located. The notification may be, for example, information describing a current location or current state of a tracking device corresponding to the lost asset. In some embodiments, the notification may additionally comprise an image of the current location and/or state of the lost asset, a scanned barcode, QR code, or other identifier of the tracking device and/or the lost asset, and the like. In some embodiments, the notification may additionally comprise a determination that the tracking device requires recharging or refurbishment, or that another action should be performed on the asset or tracking device corresponding to the asset. In other embodiments, the system controller determines whether the tracking device requires recharging or refurbishment, or whether another action should be performed on the asset or tracking device corresponding to the asset.

Responsive to the notification, the system controller transmits 1225 a second notification to each client device of the subset of client devices to terminate the search for the lost asset and to resume standard operation. In some embodiments, the system controller may then transmit 1230 a third notification to a client device to perform an action on the located asset. In some embodiments, the third notification is transmitted to the client device having found the lost asset. In other embodiments, the third notification is transmitted to another client device in the environment, e.g., if an action to be performed requires a specific user or the user of the client device having found the lost asset is unable to perform the action. The action may comprise, for example, marking or transporting the tracking device for recharging or refurbishing, transporting the asset to a specified location or area of the environment, or modifying one or more parameters or settings of the tracking device via the client device.

In some embodiments wherein a user of the wireless tracking system submits a request to locate a lost asset to the system controller, the system controller may transmit a notification to a client device of the requesting user to confirm that the lost asset has been located. The notification may include a current location of the lost asset and any actions to be performed on the lost asset.

In the embodiment of FIG. 12, the steps described herein are performed by a system controller of a wireless tracking system. In other embodiments, the actions described herein may be performed by one or more other entities of the wireless tracking system, e.g., by a master node or mesh network of the wireless tracking system, by a client device receiving input from a user of the wireless tracking system, or the like. In other embodiments, the method of FIG. 12 may include additional or different steps, or may be performed in another order.

Figure 13:
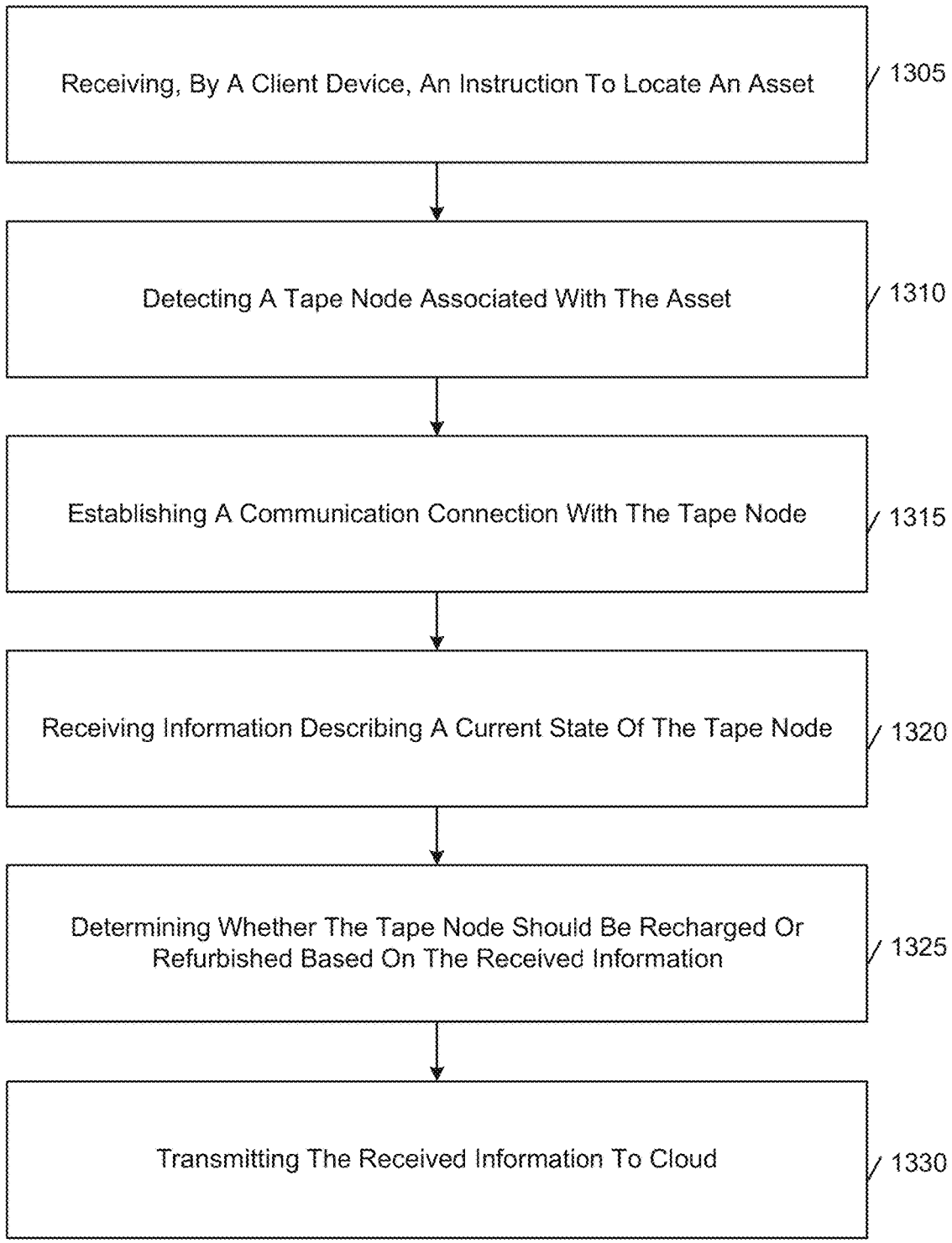
FIG. 13 is a flow diagram of a method for performing locating of assets in an environment.

FIG. 13 is a flow diagram of a method 1301 for performing locating of assets in an environment. A client device receives 1305 an instruction to locate an asset. The instruction may comprise, for example, one or more of: an identifier of the asset, an identifier of a tracking device adhered or attached to the asset, a last known location of the asset, and an image of the asset. The instruction may additionally comprise a notification to a user of the client device to perform an active or manual search, or may instruct the client device to initiate a search mode to operate in the background of other functions of the client device, e.g., such that the search is ongoing without requiring user input or action.

The client device detects 1310 a tracking device associated with the lost asset. In some embodiments, the detection is done by the client device being within a threshold distance of the tracking device, such that the client is able to establish 1315 a communication connection to the tracking device. In other embodiments wherein the tracking device is dead (e.g., has run out of battery charge) or is unresponsive due to one or more malfunctioning systems, the detection is done by a user of the client device manually scanning a barcode, QR code, or other identifier of the asset or a tracking device adhered or attached to the asset. The client device receives 1320 information describing a current state of the tracking device. The information may comprise, for example, one or more events that have occurred to the asset during a previous period of time, current sensor data of the tracking device, current location information of the asset, a current battery level of the asset, and one or more current settings or parameters of the tracking device.

In some embodiments, the client device determines 1325 whether the tracking device should be recharged or refurbished based on the received information. For example, the client device may determine that a location sensor (e.g., a GPS sensor) is malfunctioning if a current location reported by the tracking device does not match a current location of the client device. In another example, the client device may determine that the tracking device should be recharged if the current battery level of the asset is below a threshold level. The client device transmits 1330 the received information and the determination to the system controller of the wireless tracking system.

In the embodiment of FIG. 13, the steps described herein are performed by a client device of the wireless tracking system. In other embodiments, the actions described herein may be performed by one or more other entities of the wireless tracking system. In other embodiments, the method of FIG. 13 may include additional or different steps, or may be performed in another order.

Infrastructure nodes and entities in environments may additionally experience events impacting their ability to correctly perform actions. For example, gateway nodes may experience low batteries or may experience stress on electronic components due to temperature or other environmental factors. Client devices are leveraged to perform infrastructure testing. When client devices are in range of an infrastructure node, the client devices may troubleshoot or perform other testing to the infrastructure node, may reconfigure the infrastructure or update one or more settings of the infrastructure, or may flag infrastructure nodes as requiring recharging or refurbishing.

In some embodiments, the wireless tracking system maintains intelligence and logic primarily in nodes of the wireless tracking system, so as to enable tracking devices to establish hierarchies, organize data, perform computations, and the like. Infrastructure of the wireless tracking system maintains less intelligence and logic, and as such may be unable to perform complex testing during operation. As such, it is valuable for client devices in the environment to perform infrastructure testing to ensure that all nodes and entities of the infrastructure are correctly communicating, capturing information about the environment, and performing other required actions.

One or more client devices may be selected by the system controller to perform infrastructure testing as described in conjunction with FIGS. 11A-11C. In some embodiments, the selection may be performed based at least in part on a location of an infrastructure node requiring testing, e.g., a known and stationary location associated with a gateway node or server of the wireless tracking system. Additionally, in some embodiments, a set of client devices selected for infrastructure testing may be smaller than a set of client devices selected for locating of a lost asset, as the location of the node requiring testing is typically known and does not require searching by the client devices.

A client device of the selected client devices establishes a communication connection with the infrastructure node. In some embodiments wherein one or more communications capabilities of the infrastructure node are malfunctioning or down, the client device may be unable to establish a connection, and the inability to establish a connection may be reported as the results of the testing. When a communications connection is established, the client device performs one or more tests on the infrastructure node. For example, the client device may perform one or more tests or receive diagnostics to ensure that a server of the wireless tracking system is running, that the infrastructure is able to communicate via one or more communications methods (e.g., satellite, Bluetooth, etc.), that the infrastructure is correctly accessing data stored locally and remotely to the node, and the like. The client device may also gather test results of sensors or other components of the infrastructure node, e.g., voltage levels or temperature readings of the infrastructure node.

In some embodiments, the client device determines, based on results of the one or more tests, whether the infrastructure node requires recalibration, refurbishment, or recharging. Responsive to determining that the infrastructure node requires recalibration, the client device may recalibrate the infrastructure node or may reconfigure one or more settings of the infrastructure node, e.g., modifying a primary method of communication, modifying a frequency of communication, modifying a scheduled communication, and the like.

The client device may additionally flag the infrastructure node for refurbishment or recharging. The client device transmits the results of the one or more tests to the system controller, and may additionally transmit information describing recalibration of the infrastructure node if recalibration is performed.

In embodiments wherein the client device does not perform the determination, the system controller may perform one or more analyses to determine whether the infrastructure node requires recalibration, refurbishment, or recharging. The system controller may then transmit an additional instruction to one or more client devices to perform a determined action. The one or more client devices may or may not include the client device having performed the infrastructure tests, e.g., a new or different client device may be selected if the client device having performed the infrastructure tests is unable to perform the determined action or has moved away from the infrastructure node since performing the testing.

Performing Diagnostic Testing of Tape Nodes and Infrastructure

Once deployed, the wireless tracking system 400 may comprise a plurality of tape nodes, gateway devices, infrastructure nodes, and other nodes throughout an environment. Because various entities of the wireless tracking system 400 may have varying intelligence, e.g., based on where logic is primarily stored and executed in the wireless tracking system, it is valuable to be able to perform infrastructure or diagnostic testing on less intelligent nodes of the wireless tracking system and to gather diagnostic test results on more intelligent nodes of the wireless tracking system. Because client devices often move throughout the environment of the wireless tracking system, e.g., as a smartphone carried by an operator, the system controller may leverage client devices to perform diagnostic and infrastructure testing and gather test results.

In some embodiments, the system controller instructs one or more client devices to gather diagnostic information on one or more tape nodes, gateway devices, infrastructure nodes, or other nodes of the wireless tracking system 400 deployed in the environment. The one or more client devices may gather diagnostic information in the background of one or more other tasks, such that no input or action is required of the operator or user of the client devices. Diagnostic information may include, for example, voltage or battery levels of nodes, temperature or other sensor readings, functionality of one or more electronic components or systems, historic data corresponding to anomalous events, and the like. In some embodiments, a node performs a diagnostic test on itself and stores the test results. The node may transmit the stored test results when a client device connects to the node for wireless communication. In other embodiments, the node performs the diagnostic test in response to receiving instructions from the client device. In some embodiments, the one or more client devices perform the diagnostic test. For example, a client device may test a wireless communication system and wireless communication protocols of a node by attempting to perform a communication or communication routine with the node. The client device may then store the test result and/or transmit the test result to the wireless tracking system 400.

Figure 14:
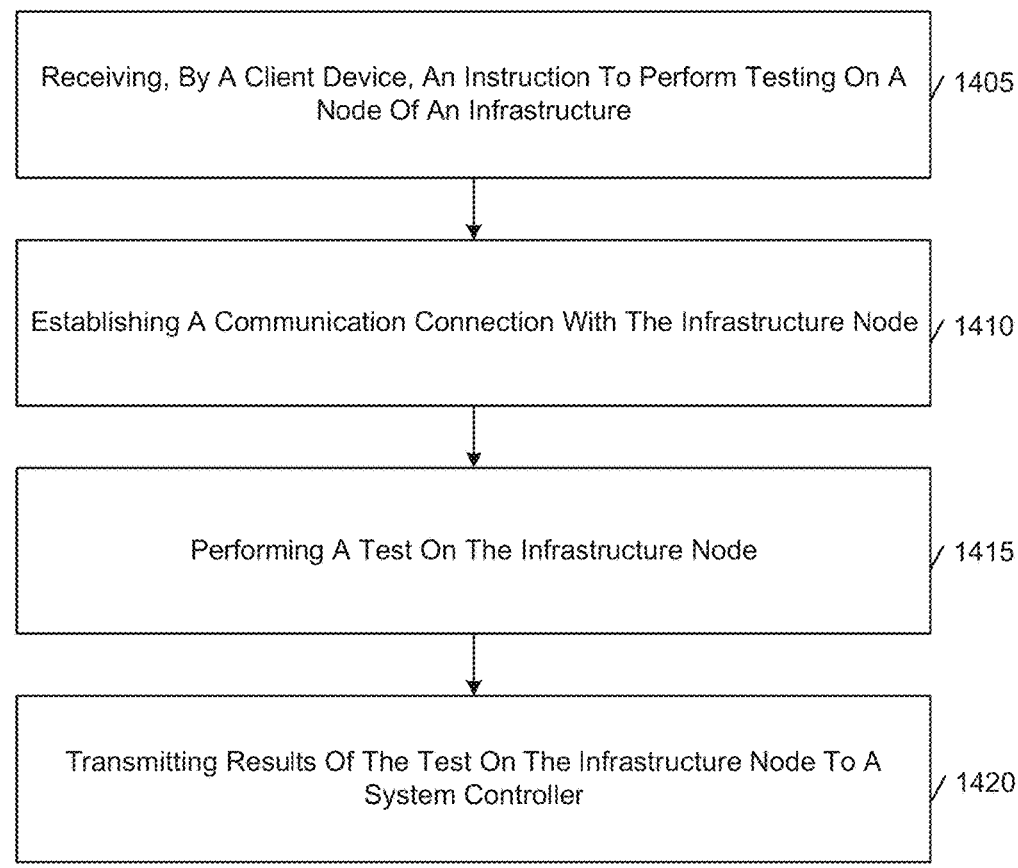
FIG. 14 is a flow diagram of a method for performing infrastructure testing in an environment.

FIG. 14 is a flow diagram of a method 1401 for performing testing in an environment. A client device receives 1405 an instruction to perform infrastructure testing on a node of an infrastructure. The instruction may further comprise an identifier of the infrastructure node, a location of the infrastructure node, one or more tests to be performed, an updated configuration for the infrastructure node, and the like. The instruction may be issued by the system controller and transmitted to the client device over a network. In some embodiments, the instruction is transmitted to the client device based on a schedule for diagnostic testing. In some embodiments, the instruction is received by the client device from a system controller of the wireless tracking system 400. The client device establishes 1410 a communication connection to the infrastructure node upon entering a communications range of the infrastructure node and performs 1415 one or more tests on the infrastructure node. The one or more tests may comprise, for example, infrastructure testing and/or diagnostic testing on the infrastructure node. In some embodiments, the client device simply initiates the tests and the infrastructure node is configured to perform the tests itself in response. The infrastructure node may then transmit the test results over the communication connection.

Based on the results of the test, the client device may determine whether the infrastructure node requires reconfiguration, refurbishment, or recharging of one or more components, parameters, or settings. In some embodiments, the client device recalibrates or reconfigures one or more parameters, settings, or components of the infrastructure node. In some embodiments, the client device flags the infrastructure node to be refurbished or recharged. In some embodiments, the client device may perform other actions impacting the infrastructure node, such as transmitting an instruction for the infrastructure node to enter a hibernation mode until further action is determined or performing other modifications to operation of the infrastructure node.

The client device transmits 1420 the results of the test on the infrastructure node to the system controller of the wireless tracking system. The client device may additionally transmit confirmation of reconfiguration or flagging for refurbishment or recharging, data captured during the infrastructure testing, and the like.

In the embodiment of FIG. 14, the steps described herein are performed by a client device of the wireless tracking system. In other embodiments, the actions described herein may be performed by one or more other entities of the wireless tracking system. In other embodiments, the method of FIG. 14 may include additional or different steps, or may be performed in another order.

Figure 15:
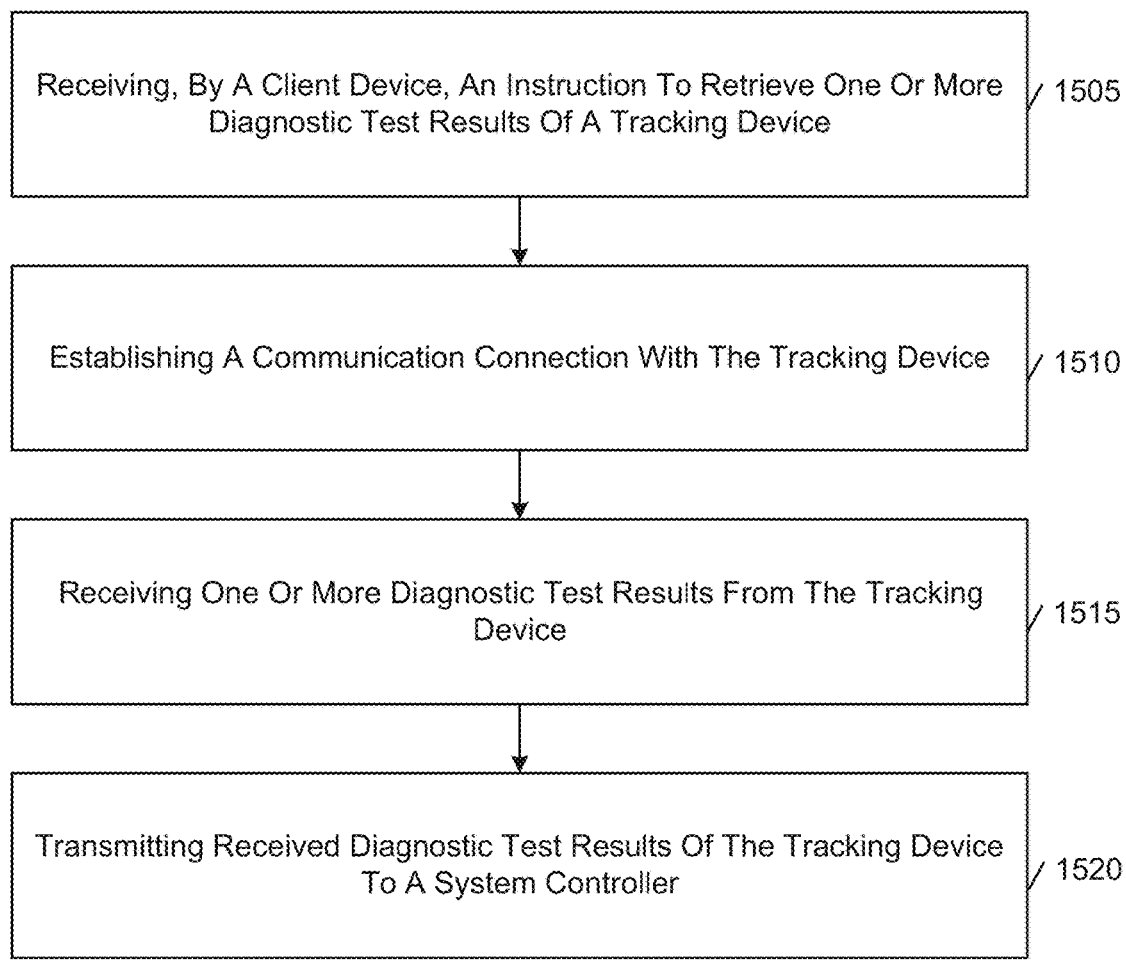
FIG. 15 is a flow diagram of a method for retrieving diagnostic test results of tracking devices by client devices.

FIG. 15 is a flow diagram of a method for retrieving diagnostic test results of tracking devices by client devices. A client device receives 1505 an instruction to retrieve one or more diagnostic test results from tracking devices deployed in an environment. The instruction may further comprise an identifier of the tracking device, a current or last known location of the tracking device, one or more diagnostic tests performed, an updated configuration for the tracking device, information describing an asset associated with the tracking device, information describing a destination or a journey of the tracking device, and the like. In some embodiments, the instruction is received by the client device from a system controller of the wireless tracking system 400.

The client device establishes 1510 a communication connection to the tracking device upon entering a communications range of the tracking device. In some embodiments, the client device may establish the communication connection by broadcasting a request within a range of the tracking device via a compatible communications system, e.g., Bluetooth. The request may comprise, for example, an identifier of the tracking device. In other embodiments, the tracking device may be instructed to activate a communications system, e.g., to be receptive to incoming communication connections, by the systems controller or another entity of the wireless tracking system, such as a gateway node or other infrastructure entity in proximity of the tracking device.

Responsive to the communication connection being established, the client device receives 1515 diagnostic test results from the tracking device. In some embodiments, the diagnostic test results are information describing a current state of the tape node, e.g., a current battery level, a current rate of depletion of battery level, a voltage level, functionality of one or more electronic components, and the like. In some embodiments, the diagnostic test results are stored in a memory of the tracking device and are retrieved responsive to the communication connection being established. In other embodiments, the tracking device performs one or more diagnostic tests responsive to the communication being established, and transmits the diagnostic test results upon completion of the diagnostic tests. In some embodiments, the client device is leveraged to perform the diagnostic tests, e.g., in testing a communications system or protocol of the tracking device.

In some embodiments, the tracking device and/or the client device may additionally perform one or more analyses of the diagnostic test results. For example, the tracking device and/or the client device may determine whether the tracking device requires reconfiguration, refurbishment, or recharging of one or more components, parameters, or settings. In some embodiments, the client device recalibrates or reconfigures one or more parameters, settings, or components of the tracking device. In some embodiments, the client device flags the tracking device to be refurbished or recharged. In some embodiments, the client device may perform other actions impacting the tracking device, such as transmitting an instruction for the tracking device to enter a hibernation mode until further action is determined or performing other modifications to operation of the tracking device.

The client device transmits 1520 the results of the one or more diagnostic tests of the tracking device to the system controller of the wireless tracking system 400. The client device may additionally transmit confirmation of reconfiguration or flagging for refurbishment or recharging, data captured during the diagnostic testing, and the like.

In the embodiment of FIG. 15, the steps described herein are performed by a client device of the wireless tracking system. In other embodiments, the actions described herein may be performed by one or more other entities of the wireless tracking system. In other embodiments, the method of FIG. 15 may include additional or different steps, or may be performed in another order.

Further details on testing of wireless nodes are discussed in U.S. Patent Application No. U.S. Nonprovisional patent application Ser. No. 17/779,994, filed on Feb. 22, 2022, titled "Locating Assets and Infrastructure Testing Using Client Devices in an IOT Device Network," which is incorporated herein in its entirety.

End-to-End Visibility of Assets

An asset being monitored by the wireless tracking system 400 may undergo several stages of a journey associated with the asset. The journey may include being shipped or transported, according to some embodiments. In some embodiments, the journey includes the lifetime of the asset, while it is involved with a task or role in an operation. For example, the asset may be a piece of industrial equipment performing a function in a factory or other industrial setting.

Figure 16:
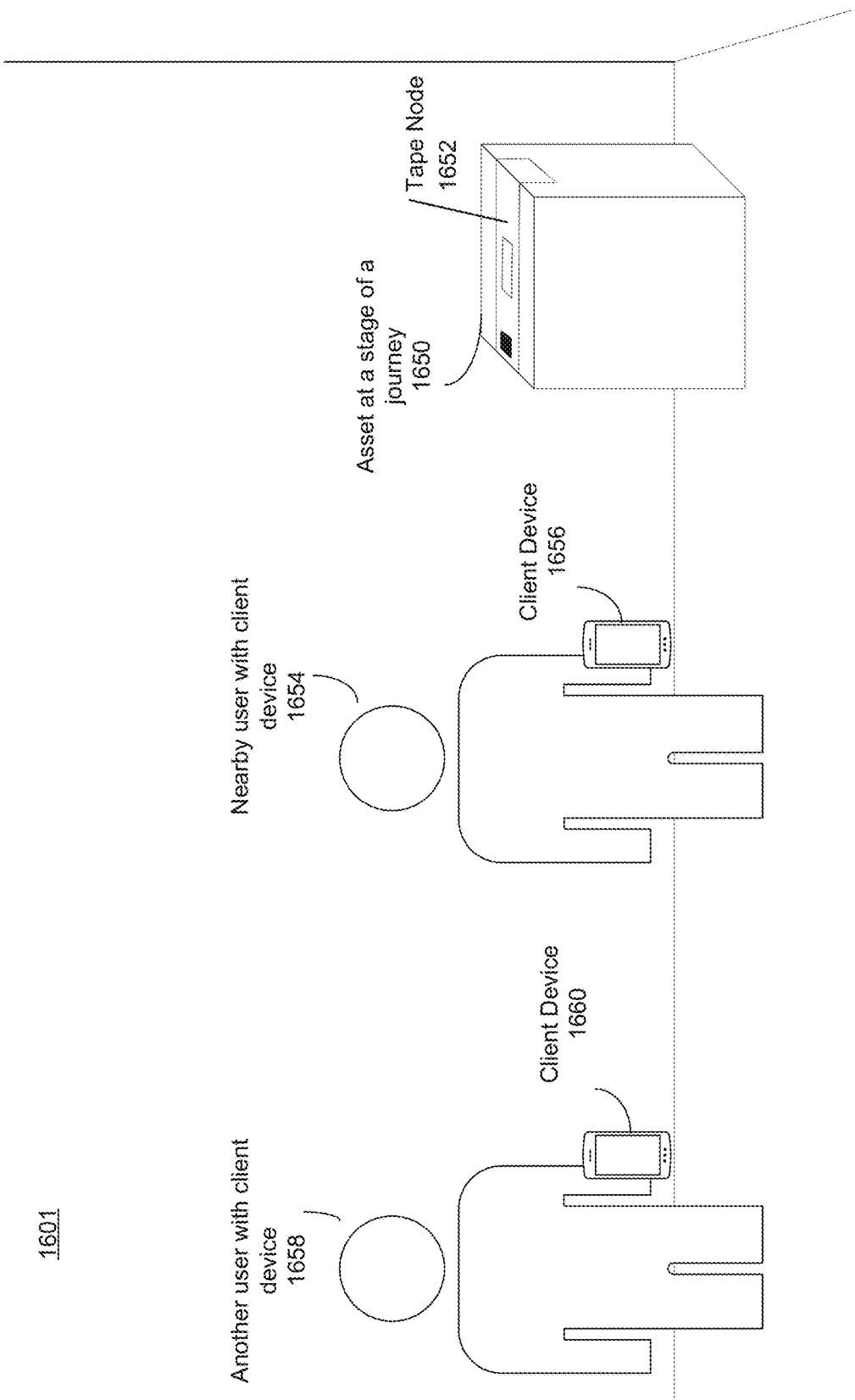
FIG. 16 shows an example environment where a user client device wirelessly communicates with a tape node to provide end-to-end visibility of a journey taken by an asset being monitored by a wireless tracking system, according to some embodiments.

FIG. 16 shows an example environment 1601 where a user client device 1656 wirelessly communicates with a tape node 1650 to provide end-to-end visibility of a journey taken by an asset 1650 being monitored by a wireless tracking system 400, according to some embodiments. The client device 1656 may be a smartphone, for example. The environment may not necessarily include infrastructure nodes (e.g., beacons, gateway devices, or other wireless communications devices permanently or temporarily installed in the environment 1601) for the wireless tracking system or nearby stationary gateway nodes that may wirelessly communicate with the tape node 1652 to determine its location and report the location to other nodes of the wireless tracking system 400. To compensate for a lack of wireless communication infrastructure, the wireless tracking system 400 may rely on client devices 1656, 1660 associated with users nearby the asset 1650 to function as gateway nodes for retrieving data from the tape node 1652 and for assisting the wireless tracking system 400 and the tape node 1652 in determining the location of the tape node 1652.

In some embodiments, the client devices 1652, 1660 execute a client device application or app (e.g., a smartphone app installed on a smartphone) which enables a client device 1652, 1660 to function as a mobile gateway node in the wireless tracking system 400, in addition to other functions. The client device app may execute in the background, without direct interaction from the user, wirelessly communicating with the tape node 1652 and exchanging data via a wireless communication connection, such as a Bluetooth connection, a WiFi connection, an NFC connection, or some other wireless communication link. In some embodiments, the wireless tracking system 400 searches for client devices 1656, 1650 that have the client device app installed and are operating in a location within a threshold distance or closest to the last known location of the asset 1650. The wireless tracking system 400, via a server of the wireless tracking system, may transmit instructions to the nearest client device 1656 to wirelessly communicate with the tape node 1652 and determine its location. The client device 1656, in response, may search in its vicinity for wireless communication devices with an identifier that corresponds to an identifier for the tape node 1652 received from the server of the wireless tracking system 400 and establish a wireless communication connection with the tape node 1652, if it is found. In some embodiments, the nearest client device 1656 receives instructions which are displayed to a user, for example, as a notification, to search for the tape node 1652 or to move closer to the last known location of the tape node 1652. The client device 1656 may display instructions to the user to stay at a location until the client device 1656 completes wireless communications with the tape node 1652 to locate the tape node 1652 and/or complete downloading data from the tape node 1652.

The client device 1656 may determine a location or an estimated location of the tape node 1652 once found, based on wireless communications with the tape node 1652 and a known location of the client device. For example, the client device 1656 may be a smartphone that can determine its own location through an onboard GPS system. The client device 1656 may determine a relative displacement of the tape node's 1652 location from the client device's 1656 location using received signal strength or other methods, according to some embodiments.

The client device 1656 then may report the determined location of the tape node 1652 to the server of the wireless tracking system 400 using a cellular communication system or WiFi communication system connected to a WiFi network. In some embodiments, the client device 1776 may additionally or alternatively relay data received from the tape node 1652 to the server using the cellular communication system or WiFi communication system. If the client device 1656 able to establish an adequate connection to a server of the wireless tracking system 400 while in the environment 1601 (for example, due to a lack of cellular reception), the client device 1755 may store the data on the asset's 1650 location and data received from the tape node 1652 on the client device's 1755 storage or memory. When the client device 1656 is later able to establish an adequate connection, the client device 1656 may then upload the data to the server of the wireless tracking system 400.

Figure 17:
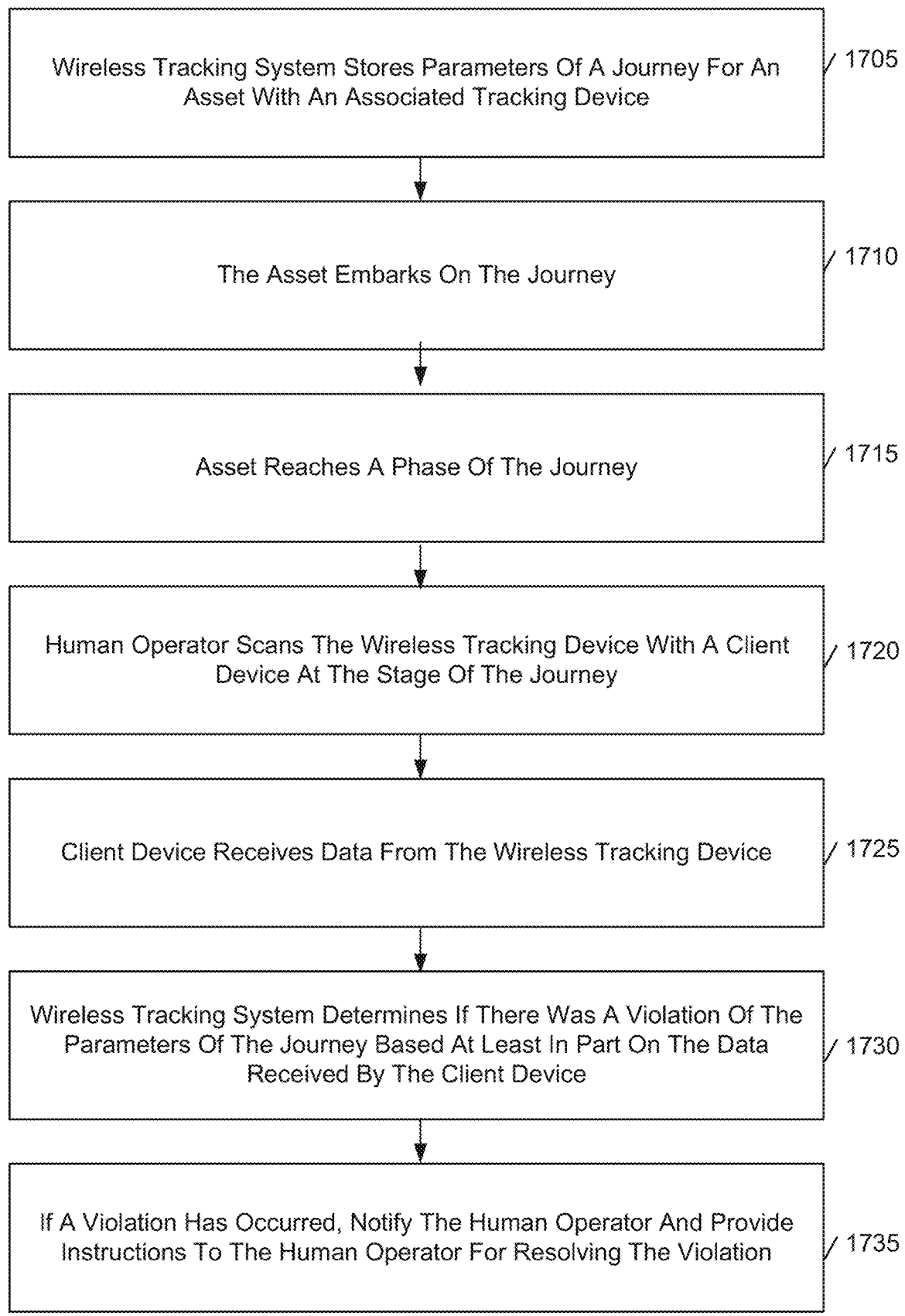
FIG. 17 is a flow diagram of a method for end-to-end visibility of a journey taken by an asset being monitored by a wireless tracking system, according to some embodiments.

FIG. 17 is a flow diagram of a method 1703 for end-to-end visibility of a journey taken by an asset being monitored by a wireless tracking system, according to some embodiments. The method is performed by nodes of the wireless tracking system 400. The asset has an associated wireless tracking device which is configured to collect data on the location and/or condition of the asset. The wireless tracking device is configured to transmit the collected data to one or more other nodes of the wireless tracking system 400. In some embodiments, the wireless tracking device is a tape node, such as the adhesive tape platform shown in FIGS. 1-5C, attached to the asset. In other embodiments, the wireless tracking device has a different form factor.

The wireless tracking system stores 1705 parameters of the journey for an asset with an associated tracking device. The parameters may include tolerable conditions or ranges of conditions that the asset can experience for the journey to be successful. The tolerable conditions may include, for example, acceptable temperatures that the asset may be exposed to, routes that the asset may take for the journey, acceptable distances that the asset may be from another asset or node, acceptable levels of acceleration or velocity that the asset may experience, acceptable locations for the asset to be in, other conditions, or some combination thereof. The wireless tracking system is configured to detect when a violation of a tolerable condition or range of conditions occurs. A violation occurs when the asset experiences a condition that is not acceptable according to the parameters of the journey.

At some point in time, the asset embarks 1710 on the journey. The journey may be a delivery of the asset from a point of origin to a destination, according to some embodiments. In other embodiments, the journey is another part of the assets life that includes one or more phases for the assets. For example, the journey may include the asset progressing through various phases of an assembly process. At a later point in time, the asset reaches 1715 one of the phases of the journey. For example, the phase of the journey may include the asset being delivered to a distribution center. A human operator associated with the phase of the journey, scans 1720 the wireless tracking device with a client device at the stage of the journey. The scan includes establishing a wireless communication connection between the client device and the wireless tracking device. The client device receives 1725 data from the wireless tracking device over the wireless communication connection. The data includes tracking data regarding the location and/or condition of the asset during the journey up to the current phase of the journey, according to some embodiments. In some embodiments, the tracking data includes data corresponding to a time frame starting from the last time the wireless tracking device was scanned by a client device and ending at the current phase of the journey.

Wireless tracking system determines 1730 if there was a violation of the parameters of the journey based at least in part on the data received by the client device. The determination may be computed or executed by the wireless tracking device associated with the asset, the client device associated with the human operator, another node of the wireless tracking system 400, a server or cloud of the wireless tracking system 400, or some combination thereof. In order to determine 1730 if a violation occurred, the client device may transmit at least a part of the data received from the wireless tracking device to another node of the wireless tracking system 400, according to some embodiments. If a violation has not occurred, the asset continues on its journey, and the process repeats from step 1715 when the asset reaches the next stage in the journey. In some embodiments, the journey may include a plurality of stages. For example, each stage may correspond to a checkpoint location that is critical for tracking the progress of the asset. If the client device determines that a violation has occurred during step 1730, the wireless tracking system 400 notifies 1740 the human operator and provide instructions to the human operator for resolving the violation. In other embodiments, the wireless tracking system 400 notifies another node of the wireless tracking system of the violation. For example, the wireless tracking system 400 may notify an alarm system which issues an alarm. In some embodiments, the alarm system corresponds to a building or facility associated with the current phase of the journey. The wireless tracking system 400 may store a log of violations in a database of the wireless tracking system. In some embodiments, the wireless tracking system 400 verifies that the violation has been resolved at a point in time after the notification 1740 is issued. The wireless tracking system may verify that the violation has been resolved based on input received from a user or human operator interacting with a client device app that corresponds to the wireless tracking system 400.

Figure 18:
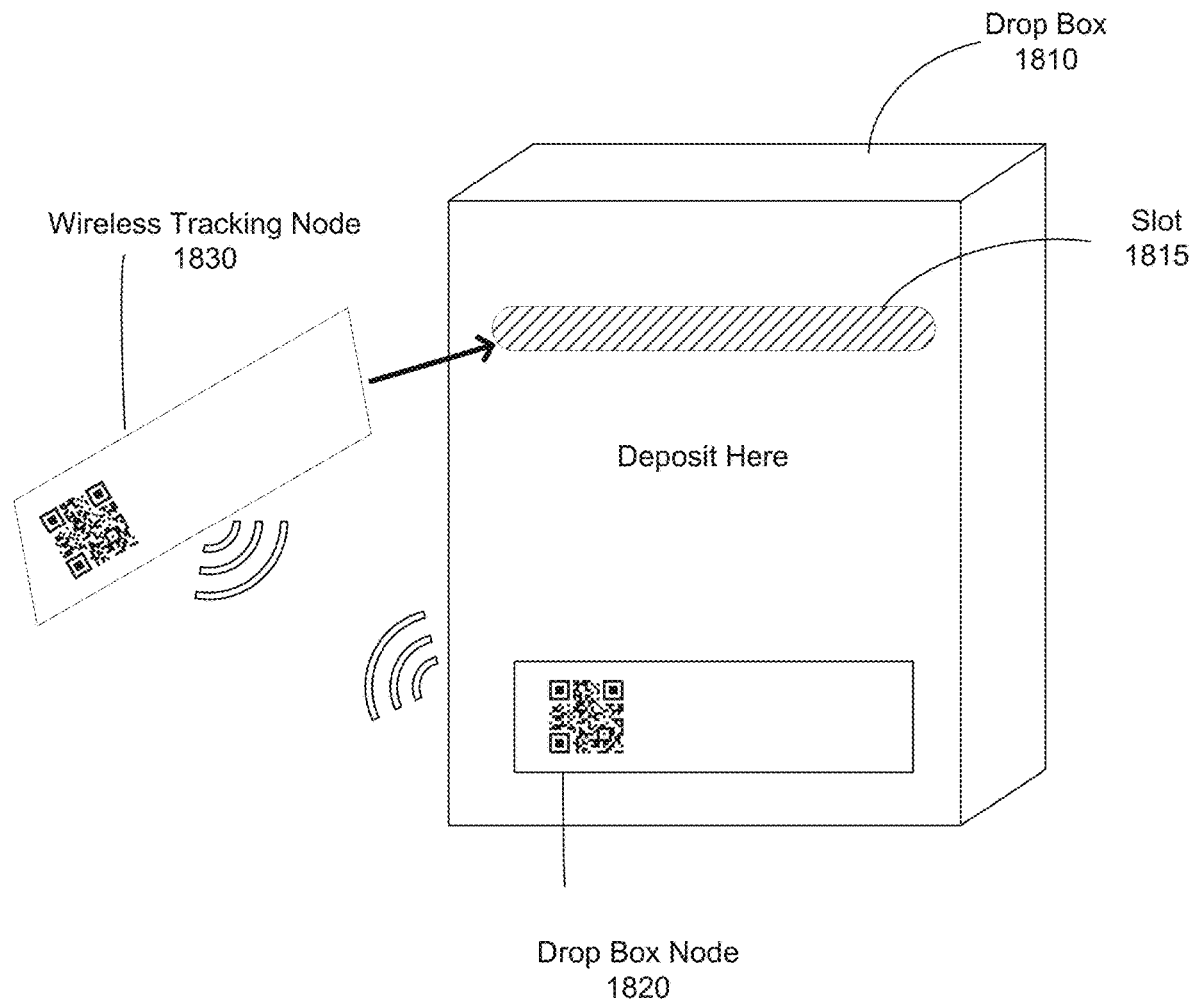
FIG. 18 shows a drop box for collecting wireless tracking devices at the endpoint of a journey for an asset, according to some embodiments.

FIG. 18 shows a drop box for collecting wireless tracking devices at the endpoint of a journey for a wireless tracking node, according to some embodiments. A drop box node 1820 is associated with the drop box 1810. The drop box 1810 is configured to collect and store wireless tracking nodes (i.e. wireless tracking devices) after they have finished tracking an asset. In the example shown in FIG. 18, the wireless tracking node 1830 is a wireless tracking device that has been removed from an asset that it has tracked up to the endpoint of the journey and is deposited in the drop box 1810 through a slot 1815 in the drop box 1810.

The drop box node 1820 is configured to detect the wireless tracking node 1830 being deposited in the drop box 1810. In some embodiments, the wireless tracking node 1830 broadcasts an endpoint signal, in response to detecting that it has reached the endpoint of its journey. For example, the wireless tracking node 1830 may determine that its location corresponds to the endpoint. The wireless tracking node 1830 may receive its location via a GPS communication module in the wireless tracking node 1830 or it may receive its location from another node of the wireless tracking system 400. The drop box node 1820 receives the endpoint signal and establishes a wireless communication connection with the wireless tracking node 1830, in response. The drop box node 1820 may receive tracking data from the wireless tracking node via the wireless communication connection. In some embodiments, the drop box node 1820 notifies members of the wireless tracking system 400 that the wireless tracking node 1830 has been deposited. The drop box node may relay the received tracking data to a client device or another node of the wireless tracking system 400. In some embodiments, the drop box node is scanned by a client device as discussed with respect to FIG. 17, and the wireless tracking system 400 determines if the asset associated with wireless tracking node 1830 experienced any violations of the parameters of its journey.

Although the wireless tracking node 1830 and the drop box node 1820 appear as wireless tape nodes in FIG. 18, they may have different form factors or may be different types of devices than is shown, according to some embodiments. For example, the drop box node 1820 may not be attached directly to the drop box 1820, but may be located in a location that is in proximity of the drop box 1810. In another example, the drop box node 1820 includes a power supply that is plugged into a wall outlet for supplying power to the drop box node 1820. Thus, the drop box node 1820 may not be constrained by battery life, in such cases.

In some embodiments, a client device associated with the users dropping off the tape node 1830 can confirm that the user is dropping off the tape node 1830 at the right drop box 1810, based on some combination of the location of the client device, wireless communications with the tape node 1830, wireless communications with the drop box node 1820, and data received from a server of the wireless tracking system 400. The client device and/or the tape node 1830 can report that delivery conditions were met (nobody dropped, heated up, etc.) or not met to the server of the wireless tracking system 400.

If a violation (package delivered to wrong place, issues with asset) occurs and is detected by the tape node 1830, the tape node 1830 may report the violation to the drop box node 1820 which relays data on the violation to a nearby client device or gateway node for reporting to the server of the tracking system 400. In some embodiments, the wireless tracking system 400 can direct a human operator to pick up a tape node 1830 delivered at the wrong location, such as a drop box 1810 that was not assigned to the tape node 1830, and resolve any other issues with the tape node 1830.

In some embodiments, the tape node 1830 can locally ping a client device associated with a user located nearby that has the client device app executing in the background. The tape node 1830 may send a notification to the client device and provide instructions as to where the tape node 1830 should be delivered to next. The user may then take custody. The client device of the user may also download data from the tape node 1830 to confirm nothing bad has happened to an asset associated with the tape node.

In some embodiments, the wireless tracking system 400 uses client devices associated with the wireless tracking system 400 to scan and/or search for tape nodes. A client device may be a smartphone, computer, barcode scanner, wearable device (e.g., smartwatch or smart bracelet), laptop, tablet PC, or other type of computing device. A client device includes a wireless communication module for communicating with the nodes of the wireless tracking system 400. The wireless communication module may be, for example, 4G, LTE, or 5G cellular communications system. A client device also includes a secondary wireless communication system for communicating with tape nodes directly. For example, the secondary wireless communication system may be a Bluetooth or BLE communication system that communicates with a tape node via a Bluetooth or BLE communication system onboard the tape node. In some embodiments, the client device is configured to scan a barcode or two-dimensional barcode (e.g., QR code) of the tape node or asset using an image sensor or camera, and determine an identifier, communication access credentials, or other data stored in the barcode.

End-to-end visibility of assets in the wireless tracking system 400 is enabled by attaching a tape node to each tracked asset. In many instances, every human operator involved with a journey of the asset has a mobile client device (e.g., smartphone, wearable device, logging device, or other mobile computing device) for personal or professional use. The wireless tracking system 400 leverages the prevalence of mobile client devices to provide visibility, even in locations where wireless communication infrastructure may not be as dense. Each person that interacts with an asset that has an attached tape node can scan the tape node with the client device. The wireless tracking system 400 can track the condition, as well as the location, of the asset at each stage of the journey, by receiving reports from client devices located at each stage over a network connection. Client devices can report to the wireless tracking system ambient conditions in the environment and conditions of the asset itself determined the tape node and reported to the client devices. A client device that receives data from a tape node may upload the data to the cloud along with GPS location data that the client device has generated using an onboard GPS location system. If the asset is a package, for example, the client device can determine and report the following: whether the asset was opened or tampered with, whether the asset was dropped or damaged, whether the asset experienced a temperature outside of a tolerable temperature range, and other conditions of the asset.

Client device or tracking system controller in the cloud (also referred to herein as "the cloud") can make decisions for an asset. For example, a client device or the cloud can determine whether the asset should be delivered to the final recipient. If a condition for delivery is not met, the client device or the cloud instructs human operator not to deliver the asset to the final recipient. In another example, a client device or the cloud can determine whether an asset needs to be replaced with a new or different asset. The client device can notify the human operator that package does not meet requirements for delivery to the final recipient or end customer and request a replacement using a network service or app.

Various communication mechanisms may be used to notify users in an environment of a tracked asset to take an action on the asset. A notification may be displayed on a client device of a user in the environment. An alarm may be activated in a building or environment. The cloud can take steps to raise awareness, such as by sending an e-mail or message, making a phone call using an automated system, raise alerts on a system or a dashboard being monitored by a system administrator, or by using other methods. In some embodiments, a user is wearing a wearable device that may be used to alert the user of an necessary action on an asset. For example, a user near the device may be wearing a smart watch or smart bracelet which vibrates when the user is near an asset that requires intervention by the user. Similarly the wearable device may receive alert and display notifications.

In some embodiments, the operations of a user are interrupted in order to confirm the location of the asset in the wireless tracking system and validate whether the asset is on the right course. For example, a scan of a tape node may be initiated by au ser using a client device. The user presses a button or another interactive element on an associated app on their client device, which initiates a wireless communication link with the tape node. The client device interacts with the tape to determine its location and the expected itinerary for the tape node. The client may checks if the asset is at the correct location, and trigger further actions, if it is not.

A tape node on a tracked asset may track and store on its own memory or storage every wireless communication interaction it makes with client devices and other nodes of the wireless tracking system 400. The tape node may store identifiers for every user, client device, wearable device, smart badge and other wireless communication devices it has interacted with on its local memory or storage, according to some embodiments. Based on the historical data of its interactions that is logged, the wireless tracking system may track which operators and services caused certain results to happen during the asset's journey. For example, the wireless tracking system may determine who dropped a package or who delivered the package to an incorrect destination based on the log. Additionally, events for the asset detected by the wireless tracking system 400 can be associated with an identifier for a client device or a user.

A tape node on an asset, a client device communicating with the tape node, and the cloud can collaboratively determine whether an event is happening (e.g., a violation of delivery conditions that requires an alarm in the wireless tracking system 400). The tape node may sense that it is outside of a geofence or that another condition has been exceeded or violated. The tape node can perform the logic to detect the event or violation. The tape node can also communicate to devices in its environment (wearable, client device, etc.). The tape node can receive GPS coordinate from a client device. Further decision making on how to resolve the event or violation can happen in the client device. Further decision making can also happen in the cloud, in addition or alternatively.

Various methods may be used to alert users of events and violations detected by the wireless tracking system 400. Different notifications may be served to different human operators depending on the role of the human operator. For example, different notifications may be served to a delivery driver than to a supervisor of a delivery dispatch center. Depending on who the end user for the alert is, the algorithm for sending the notification may change. A tape node may detect human operator with wearable device is within a range and send a notification to the human operator's wearable device. The tape node may also check that the human operator took an action to resolve situation. For example, a tape node may detect that it is on a conveyor belt it should not be on. The tape node may transmit an alert to a nearby user's client device or wearable device and later check if the alert was ignored, based on if the tape node is still on the same conveyor belt. The tape node itself may determine if problem was solved. The tape node can search for nearby client devices/wearable associated with a user that has a supervisor role (or specific role that is relevant), in response to the ignored alert, and alert the user with the supervisor role.

Client Device Interactions and Asset Monitoring at Checkpoint Locations

Figure 19:
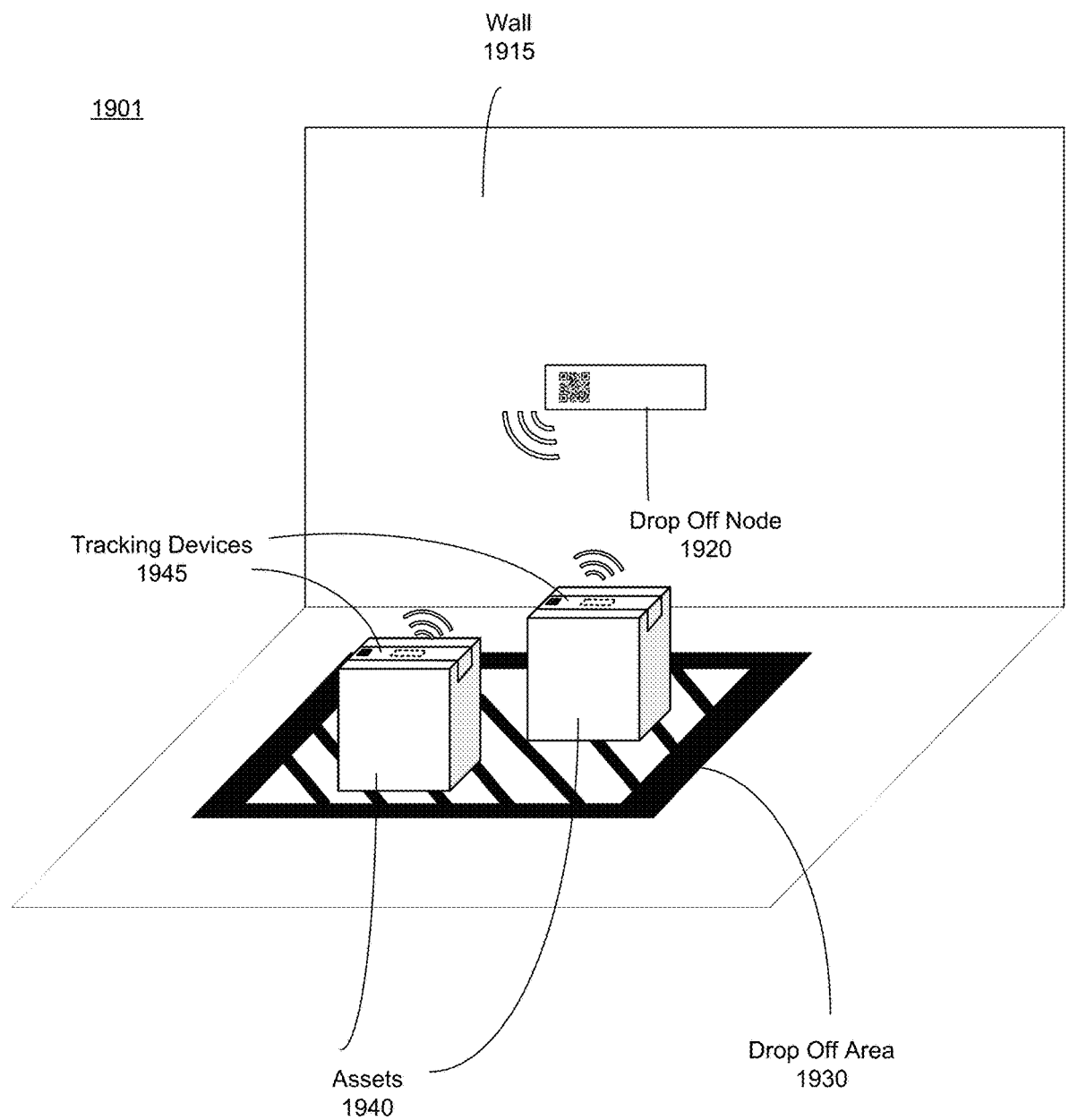
FIG. 19 shows an example environment 1901 including a drop-off node 1920 that detects and wirelessly communicates with tracking devices associated with assets 1940 that are moved into a drop-off area 1930, according to some embodiments.

FIG. 19 shows an example environment 1901 including a drop-off node 1920 that detects and wirelessly communicates with tracking devices 1945 associated with assets 1940 that are moved into a drop-off area 1930, according to some embodiments. The drop-off node 1930 is an embodiment of an infrastructure node. The drop-off area 1930 may be an area or location designated for users and human operators to drop off and pick up assets. For example, the drop-off area 1930 may be a designated area for packages to be gathered for pick up by a delivery person. A drop-off node 1920 is located within a threshold distance from the drop-off area 1930 and is associated with the drop-off area 1930. In the example shown in FIG. 19, the drop-off node 1920 is attached to a wall 1915 near the drop-off area 1930, but in other examples, the drop-off node may be in a different location. For example, the drop-off node 1920 may be attached to a floor, a piece of infrastructure, or some other object near the drop-off area 1930. A drop-off node, as referred herein, is a wireless communication device that is included as one of the nodes of the wireless tracking system 400 and may also be an embodiment of an infrastructure node. A drop-off node is configured to wirelessly communicate with at least one other node of the wireless tracking system 400 (e.g., a tracking device, a tape node, a gateway node or device, a client device, or a server of the wireless tracking system). In the example shown in FIG. 19, the drop-off node 1920 is an embodiment of a tape node, but it is not limited thereto. The drop-off node 1920 may be another type of wireless communication device having, for example, a rigid form factor. In some embodiments, the drop-off node is integrated with the infrastructure of a building or facility (e.g., receiving electrical power from a power line).

Although the drop-off area 1930, is shown as a stationary location, in FIG. 19, the drop-off area 1930 may also be the location of an object or environment that moves. For example, the drop-off area 1930 may be part of a vehicle, such as the vehicle 2610 shown in FIG. 26. The same methods and systems discussed with respect to FIGS. 19-25 may also apply to drop-off areas that are not stationary, such as portions of vehicles.

The drop-off node 1920 is configured to wirelessly communicate with the tracking devices 1945 via a first wireless communication interface (e.g., Bluetooth, LoRa, Wifi, etc.) that is compatible with a wireless communication interface of the tracking devices 1945. The drop-off node detects wireless tracking devices 1945 in the drop-off area based on wireless communications received from the tracking devices 1945. The wireless tracking system 400 can determine if the assets 1940 are within a threshold distance of the drop-off area based on a communication connection between the tracking devices 1945 and the drop-off node 1920. The first wireless communication interface has an associated communication range. Therefore, if the tracking devices 1945 are successfully communicating with the drop-off node 1920 using the first wireless communication interface, the associated assets 1940 are within a threshold distance from the drop-off area 1930 corresponding to the communication range of the first wireless communication interface. The drop-off node 1920 may track, log, and transmit to other nodes the detected location of the assets 1945. The drop-off node 1920 may also be configured to transmit an alert or notification to the wireless tracking system 400 when it no longer detects a successful communication connection with the tracking devices 1945, indicating that the assets 1940 are no longer within the threshold distance from the drop-off area 1930.

The tracking devices 1945 collect tracking data on the assets 1940 and store the tracking data on a memory of the tracking devices. The tracking devices 1945 are embodiments of a tape node, according to some embodiments. The tracking data may include location data for a respective asset 1940, such as a log of tracked locations of the respective asset 1940. After the tracking devices 1945 establish a communication connection with the drop-off node 1920, the tracking devices 1945 transmit at least a portion of the tracking data stored on their respective memories to the drop-off node 1920. The transmitted tracking data may include historical tracking data that has been stored on the memory of the respective tracking device 1945 but has not yet been uploaded to the wireless tracking system 400. The drop-off node 1920 may store the received tracking data on a memory of the drop-off node 1920. The drop-off node's

1920 memory may be larger than the memory of a respective tracking device 1945, according to some embodiments. Thus, the tracking device 1945 may conserve storage space on its memory by transmitting the tracking data to the drop-off node 1920 and deleting the transmitted tracking data from its own memory.

The drop-off node, in some embodiments, transmits an alert to other wireless nodes of the tracking system 400, in response to detecting unauthorized or improper removal of an asset 1940 from the drop-off area. In some embodiments, the drop-off node may additionally or alternatively, transmit an alert to other wireless nodes of the tracking system 400, in response to detecting that the addition of an asset 1940 in the drop-off area is unauthorized or improper. The drop-off node may alert a nearby client device of a user, in some embodiments.

In some embodiments, the drop-off node 1920 then transmits the data for upload to the wireless tracking system 400. The drop-off node 1920 may transmit the data to another node of the wireless tracking system 400 using a second wireless communication interface, according to some embodiments. For example, the drop-off node 1920 may transmit the data using an integrated cellular communication interface to a server and/or database of the wireless tracking system 400.

In some embodiments, the drop-off node 1920 transmits the received tracking data to a client device when the client device enters a communication range of the drop-off node 1920. The client device may be a smartphone associated with a human operator. According to some embodiments, the drop-off node 1920 transmits the tracking data received from the tracking devices 1945 using the first communication interface (e.g., Bluetooth) which is compatible with a communication interface of the client device. The client device may store the received tracking data, according to some embodiments. The client device then uploads the tracking data to a server and/or database of the wireless tracking system 400 using another wireless communication interface. In some embodiments, the other wireless communication interface has a longer communication range than the communication range of the first wireless communication interface. In further embodiments, the other wireless communication interface is a cellular interface, a WiFi interface, or some other wireless communication interface or system. Thus, the client device is configured to collect tracking data from the drop-off node 1920 and relay the tracking data to the wireless tracking system 400. Using the client device to perform long range communications over a wider area network of the tracking data collected by the tracking devices 1945 may conserve or limit power consumption of the tracking devices 1945 and the drop-off node 1920. In embodiments where the tracking devices 1945 and the drop-off node 1920 are battery powered, this may allow for the tracking devices 1945 and the drop-off node 1920 to function for a longer period of time without need for replacement or refurbishment.

Figure 20:
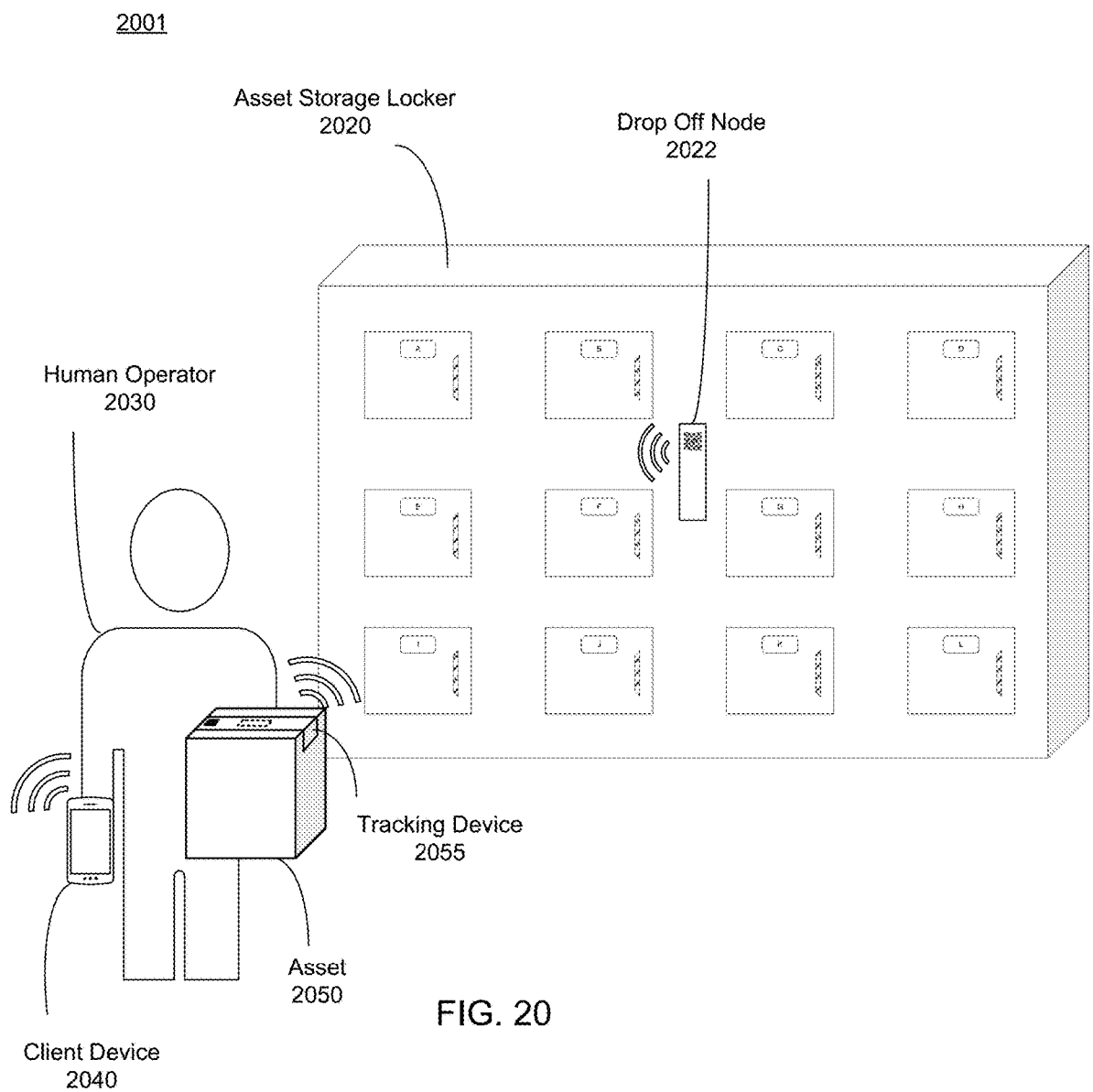
FIG. 20 shows an example environment 2001 including a drop-off node 2022 attached to an asset storage locker 2020 that stores assets 2050 dropped off by users 2030, according to some embodiments.

FIG. 20 shows an example environment 2001 including a drop-off node 2022 attached to an asset storage locker 2020 that stores assets 2050 dropped off by users 2030, according to some embodiments. The example environment 2001 and the asset storage locker 2020 is similar to the example environment 1901 and the drop-off area 1930, shown in FIG. 19. The drop-off node 2022 and the tracking device 2055 also function similarly to the drop-off node 1920 and the tracking device 1945, shown in FIG. 19. In some embodiments, the asset storage locker 2020 is a smart storage locker that includes a kiosk or integrated client device that a human operator or user 2040 can interact with. For example, the smart storage locker may include an associated kiosk that allows the user to open up one of the lockers in the asset storage locker 2020 and drop off a package for delivery.

Figure 21:
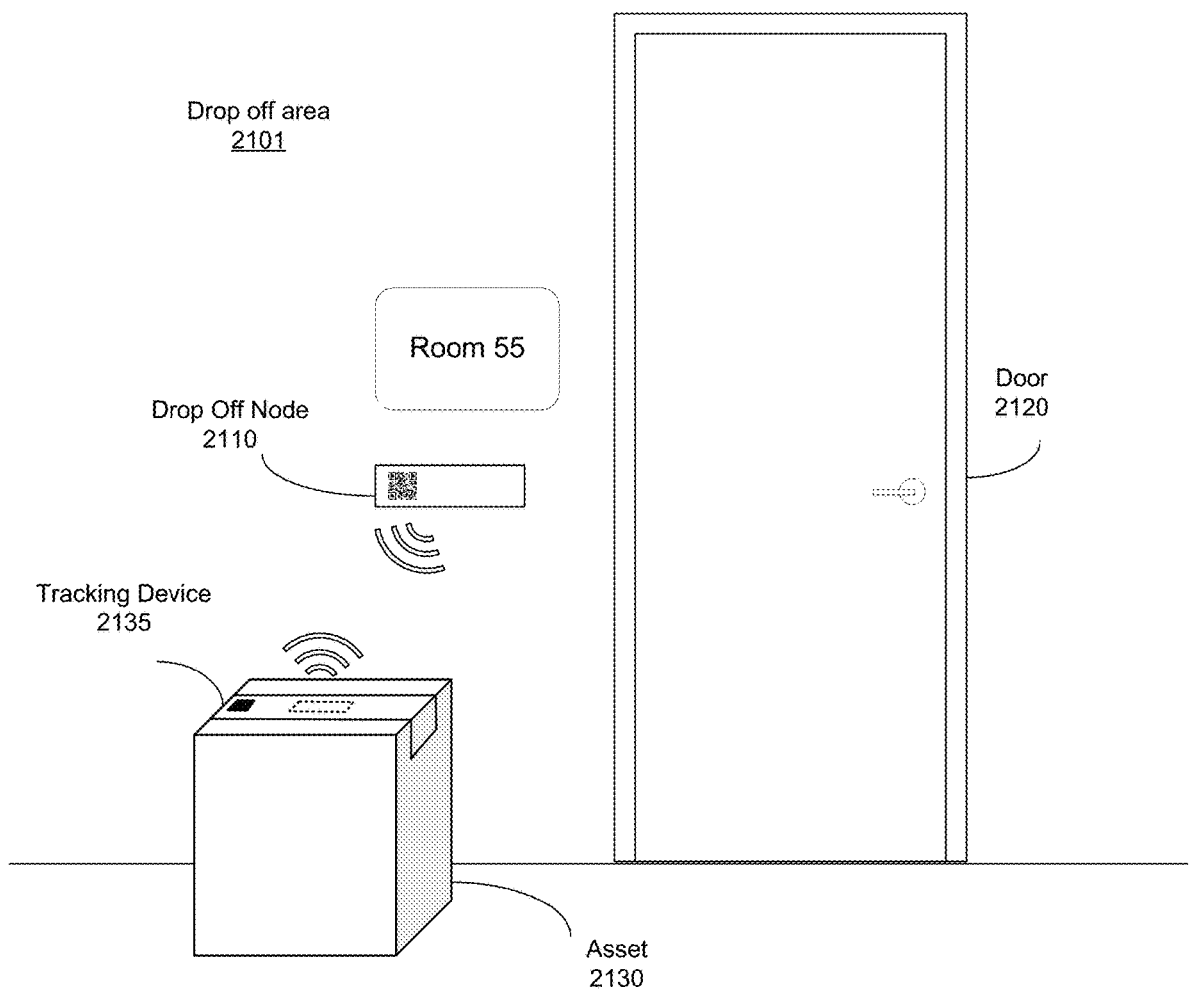
FIG. 21 shows an example environment that includes a drop-off area 2101 and drop-off node 2010 associated with a door 2020 in an indoor location where assets 2030 with associated tracking devices 2035 may be dropped off or picked up, according to some embodiments.

FIG. 21 shows an example environment that includes a drop-off area 2101 and drop-off node 2110 associated with a door 2120 in an indoor location where assets 2030 with associated tracking devices 2035 may be dropped off or picked up, according to some embodiments. The drop-off area 2101 shown is similar to the example environment 1901 and the drop-off area 1930, shown in FIG. 19. The drop-off node 2110 and the tracking device 2135 also function similarly to the drop-off node 1920 and the tracking device 1945, shown in FIG. 19. The drop-off node 2110, in this example, is associated with the location of the door 2120, corresponding to a room 55 in an indoor environment. The drop-off node 2110 may be associated with the door 2120 in the wireless tracking system 400 during an initialization procedure for the drop-off node 2110. For example, during installation of the drop-off node, a user may use an app on a client device to associate the drop-off node 2110 with the door 2120. In response, the wireless tracking system 400 may store the association in a database. The door 2120 may be a delivery destination for packages or assets in transit, such as the asset 2130, according to some embodiments.

Figure 22:
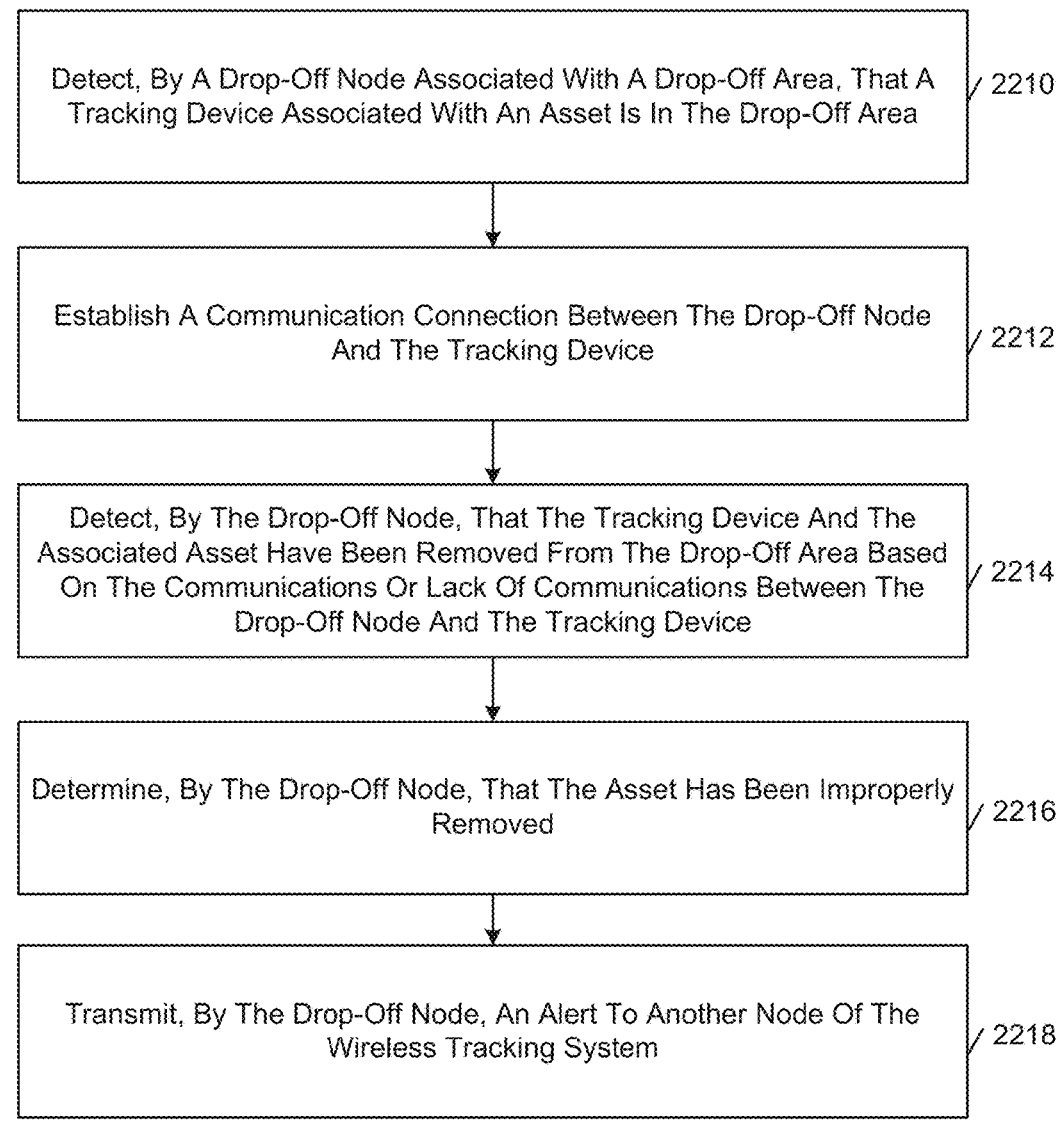
FIG. 22 is a flowchart for an example method 2201 of detecting and wirelessly communicating with a tracking device associated with an asset in a drop-off area associated with a drop-off node, according to some embodiments.

FIG. 22 is a flowchart for an example method 2201 of detecting and wirelessly communicating with a tracking device associated with an asset in a drop-off area associated with a drop-off node, according to some embodiments. The method 2201 includes detecting 2210, by a drop-Off node associated with a drop-off area, that a tracking device associated with an asset is in the drop-off area. The drop-off node and the tracking devices establish 2212 a wireless communication connection between the drop-off node and the tracking device. The tracking device, in some instances, may transmit an identifier associated with the tracking device. Similarly, in some embodiments, the tracking device may transmit to the drop-off node data on the asset, such as an identifier for the asset, a type of asset, or other data on the asset. In some embodiments, the tracking device wirelessly transmits rules for the asset to the drop-off node. The rules may include conditions for proper or authorized removal of the asset from the drop-off area. The rules may also include conditions of the asset or the drop-off area that should be maintained for the asset. For example, if the asset is sensitive to temperature, the rules may include an air temperature or other temperature range that the drop-off area must maintain for the integrity of the asset. Either of the tracking device or the drop-off node may include sensors for detecting conditions of the asset and/or the drop-off area, according to some embodiments.

The drop-off node detects 2214 that the tracking device and the associated asset have been removed from the drop-off area based on the communications or lack of communications between the drop-off node and the tracking device. For example, the distance between the drop-off node and the tracking device may be determined by one of the tracking device and the drop-off node based on received signal strength of wireless communications between the drop-off node and the tracking device. The removal of the tracking device from the drop-off area may be detected based on a determined or estimated distance between the tracking device and the drop-off node being greater than a threshold distance.

The drop-off node determines 2216 if the asset has been improperly removed or removed without authorization. Example of removal from the drop-off area without authorization or improper removal includes theft, larceny, removal of the asset by a user that is not authorized to do so, removal of the asset at a time that is not designated for the asset, removal of the asset while conditions of the asset are outside of an acceptable range (e.g., a temperature of the asset measured by a sensor of the tracking device being outside of a threshold range at the time of removal), and removal of the asset after tampering of the asset has been detected among other examples. If it is determined that the asset has been improperly removed, in response, the drop-off node transmits 2218 an alert to another node of the wireless tracking system.

Figure 23:
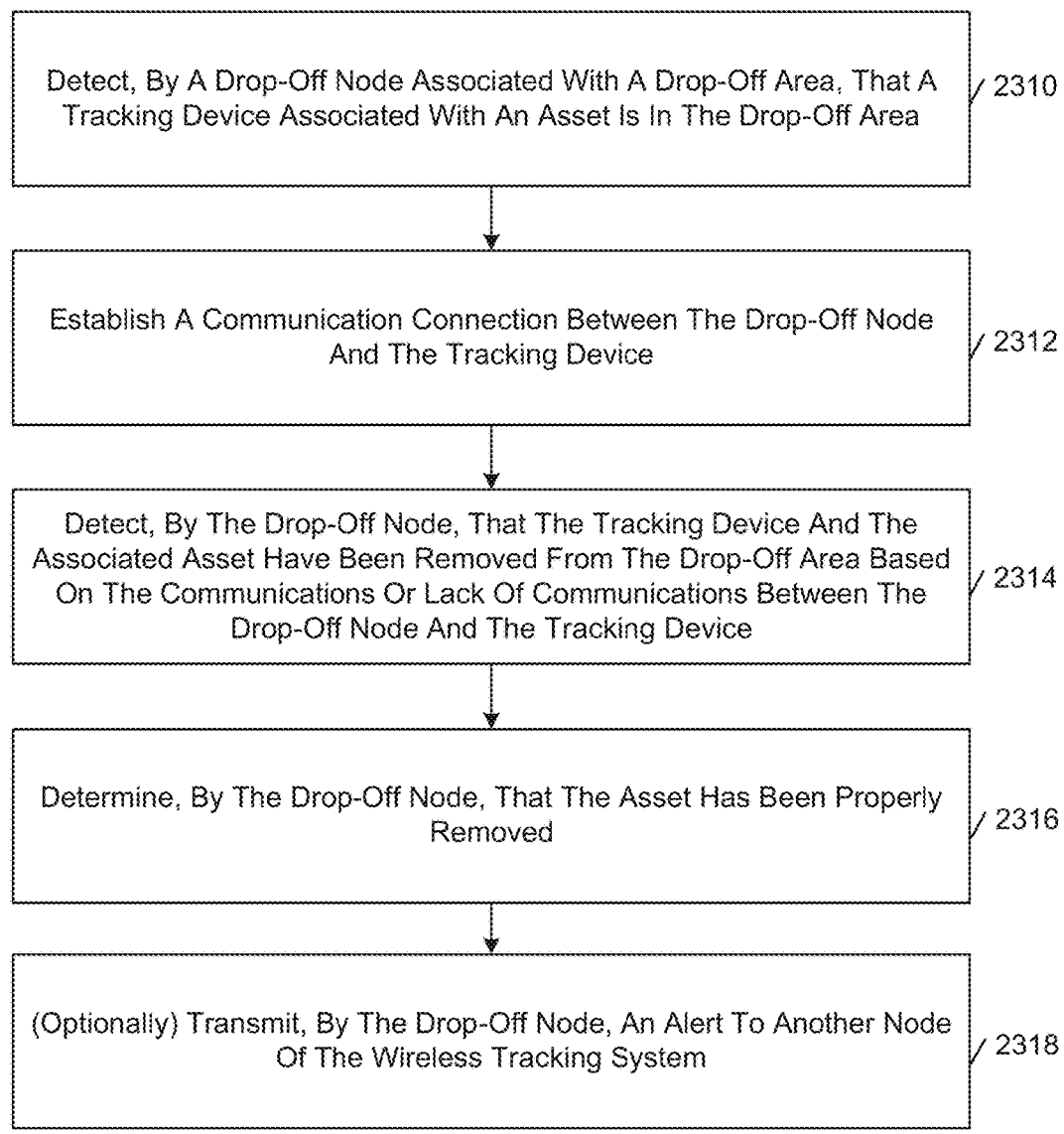
FIG. 23 is a flowchart for an example method 2301 of detecting events and raising alerts in a wireless tracking system for an asset in a drop-off area associated with a drop-off node, according to some embodiments.

FIG. 23 is a flowchart for an example method 2301 of detecting events and raising alerts in a wireless tracking system for an asset in a drop-off area associated with a drop-off node, according to some embodiments. The method includes detecting 2310, by a drop-off node associated with a drop-off area, that a tracking device associated with an asset is in the drop-off area.

The detection of the asset in the drop-off area may be based on wireless communications between the drop-off node and the tracking devices. The drop-off node and the tracking devices may automatically establish a wireless communication connection between the drop-off node and the tracking device when the two are within a threshold distance or range of each othhr. The tracking device, in some instances, may transmit an identifier associated with the tracking device. Similarly, in some embodiments, the tracking device may transmit to the drop-off node data on the asset, such as an identifier for the asset, a type of asset, or other data on the asset. In some embodiments, the tracking device wirelessly transmits rules for the asset to the drop-off node. The rules may include conditions for proper or authorized removal of the asset from the drop-off area. The rules may also include conditions of the asset or the drop-off area that should be maintained for the asset. For example, if the asset is sensitive to temperature, the rules may include an air temperature or other temperature range that the drop-off area must maintain for the integrity of the asset. Either of the tracking device or the drop-off node may include sensors for detecting conditions of the asset and/or the drop-off area, according to some embodiments.

The drop-off node detects 2314 that the tracking device and the associated asset have been removed from the drop-off area based on the communications or lack of communications between the drop-off node and the tracking device. For example, the distance between the drop-off node and the tracking device may be determined by one of the tracking device and the drop-off node based on received signal strength of wireless communications between the drop-off node and the tracking device. The removal of the tracking device from the drop-off area may be detected based on a determined or estimated distance between the tracking device and the drop-off node being greater than a threshold distance.

Then, the drop-off node determines 2316 if the asset has been properly or improperly removed from the drop-off area. If the drop-off node determines 2316 that the asset has been properly removed or removed with authorization, for example, based on received rules for the asset, the drop-off node, in response, may (optionally) transmit an alert 2318 to another node of the wireless tracking system that indicates the proper removal or authorized removal of the asset from the drop-off area.

In some embodiments, the drop-off node or the other node update a server of an associated tracking system to update the server on the whereabouts and movement of the asset. In other embodiments, the drop-off node does not automatically transmit the alert to the wireless tracking system. For example, the drop-off node may only provide the data on the asset being removed from the drop-off area, in response to receiving a request for the data.

FIG. 24 is a flowchart for an example method 2401 of using a client device to collect tracking data on assets monitored by associated tracking devices from a drop-off node associated with a drop-off area, according to some embodiments.

The method 2401 includes detecting, by a drop-off node associated with a drop-off area, that one or more tracking devices, each tracking device associated with an asset, is in the drop-off area. The drop-off node and each tracking device establishes 2412 a communication connection between the drop-off node and the respective tracking devices.

The drop-off node 2414 then receives tracking data from the one or more tracking devices. The tracking data may include location data, in some embodiments. The location data may include a list of locations and times, a trajectory, a path, a geographic route, or other location data. The tracking data may also include other data, such as sensor data gathered by sensors integrated with the tracking devices, data communicated from other nodes of an associated tracking system, and other kinds of data.

The drop-off node detects 24165 that a client device associated with a human operator is in the drop-off area. In some embodiments, the detection of the client device is based on at least one of wireless communications between the client device and the drop-off node, location data on the client device received by the drop-off node, sensor data captured by a sensor in the drop-off area, or other data received by the drop-off node. The drop-off then node authenticates 2418 the client device to determine if it is an authorized client device associated with an authorized user of the tracking system.

Responsive to authenticating the client device as an authorized client device, the drop-off node transmits 2418 the tracking data received from the one or more tracking devices to the client device, whereby the client device uploads the data to the wireless tracking system, e.g., to a server of the wireless tracking system 400.

FIG. 25 is flowchart for an example method 2501 of using a client device to raise alerts for assets in a wireless tracking system based on tracking data collected from tracking devices associated with the assets, according to some embodiments.

The method 2501 includes detecting 2510, by a client device, that the client device is near a drop-off node associated with a drop-off area. The client device may be executing software or an app that is associated with the tracking system, in some embodiments. The client device and the drop-off node establish 2512 a communication connection between the drop-off node and the client device. The client device is authenticated 2514 by the drop-off node to determine if the client device is an authorized client device of the tracking system.

After successfully being authenticated, the client device receives 2516 tracking data collected by the drop-off node from one or more tracking devices, each tracking device associated with an asset, that was in the drop-off area. The client device analyzes the received data and determines 2518 that an alert condition has been triggered based on the received tracking data. The alert condition may include, but is not limited to, a rule being violated for one of the oner more assets that was in the drop-off area. In some embodiments, the client device downloads the rules for the oner more assets from a server of the wireless tracking system, using, for example, an internet connection. In other embodiments, instead of analyzing the received data itself, the client device relays the data to a server of the tracking system or the cloud determines if an alert condition has been triggered.

The client device then transmits 2520 an alert to other nodes of the wireless tracking system. The client device may directly transmit 2520 the alert to a server of the wireless tracking system using, for example, an internet connection. In some embodiments, the client device sends a message (e.g., SMS, MMS, or other message services), or makes a phone call, in response to the alert condition being triggered. The client device may transmit 2520 the alert to a nearby wireless node of the tracking system (e.g., a tape node, a gateway device, or another client device) using short-range (e.g., Bluetooth, BLE, Zigbee) or medium range (e.g., LoRa, WiFi) wireless communications. The client device may also optionally upload 2522 a subset of the tracking data to the wireless tracking system.

Figure 26:
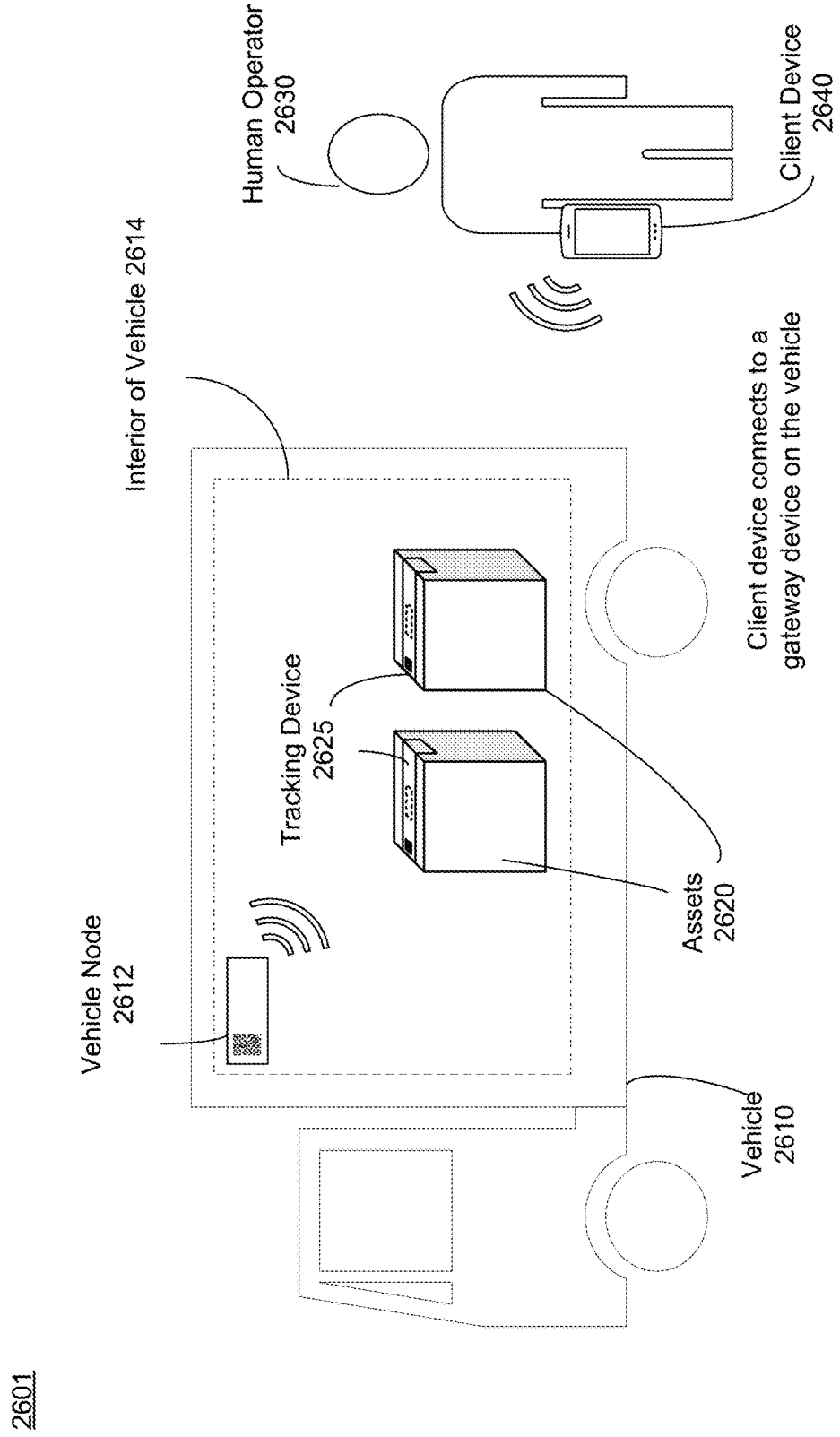
FIG. 26 shows an example environment 2601 including a vehicle 2610 used to transport assets 2620, a vehicle node 2612 that communicates with tracking devices 2625 associated with the respective assets, and a client device 2612 that communicates with the vehicle node 2612 to retrieve tracking data on the assets 2620.

FIG. 26 shows an example environment 2601 including a vehicle 2610 used to transport assets 2620, a vehicle node 2612 that communicates with tracking devices 2625 associated with the respective assets, and a client device 2612 that communicates with the vehicle node 2612 to retrieve tracking data on the assets 2620. The vehicle 2610 is used to transport assets. One or more of the assets 2620 may include a tracking device 2625 for tracking the location and environmental conditions of the respective asset 2620. The tracking device 2625 is an embodiment of a tape node, according to some embodiments, but in other embodiments may be a different type of tracking device. A vehicle node, as referred to herein, is a wireless communication device configured to wirelessly communicate with tracking devices on assets and client devices that are inside of or around an associated vehicle. A vehicle node is an embodiment of a drop-off node that is attached to a vehicle. In some embodiments, the vehicle node 2612 is a gateway device or an embodiment of a tape node. In the example shown in FIG. 26, the vehicle node 2612 is installed on the interior of the vehicle 2610, e.g. in a cargo trailer of a truck, but in other embodiments, the vehicle node 2612 may be installed on the exterior of the vehicle 2610.

The client device 2640 of the user communicates with the vehicle node 2612, when the client device 2640 is in a location that is within a range of the vehicle node 2612. In some embodiments, the vehicle node 2612 transmits data on the assets 2620 to the client device 2640, reporting which assets are inside the vehicle 2614. If an alert condition or a violation of a rule for the vehicle 2610 or the assets 2620 has been detected by the vehicle node 2612, the vehicle node 2612 may send an alert to the client device 2640 which notifies the human operator 2630 of the alert condition or the rule violation. The alert may include instructions on how to resolve the alert condition or the rule violation. For example, the alert may indicate that one of the assets 2620 is loaded onto the wrong vehicle 2610, and the alert may instruct the human operator 2640 to remove the respective asset from the vehicle 2610.

In some embodiments, the user 2630 carries or wears a user wireless node, which is a wireless node of the tracking system that is associated with the user 2630. For example, the user wireless node may be a wearable device, a smart badge, a tape node attached to an object the user 2630 is carrying, or another type of wireless communication device. The user wireless node may communicate with the vehicle node 2612 in addition to or alternatively to the client device 2640 to identify the user 2630 to the vehicle node.

Figure 27:
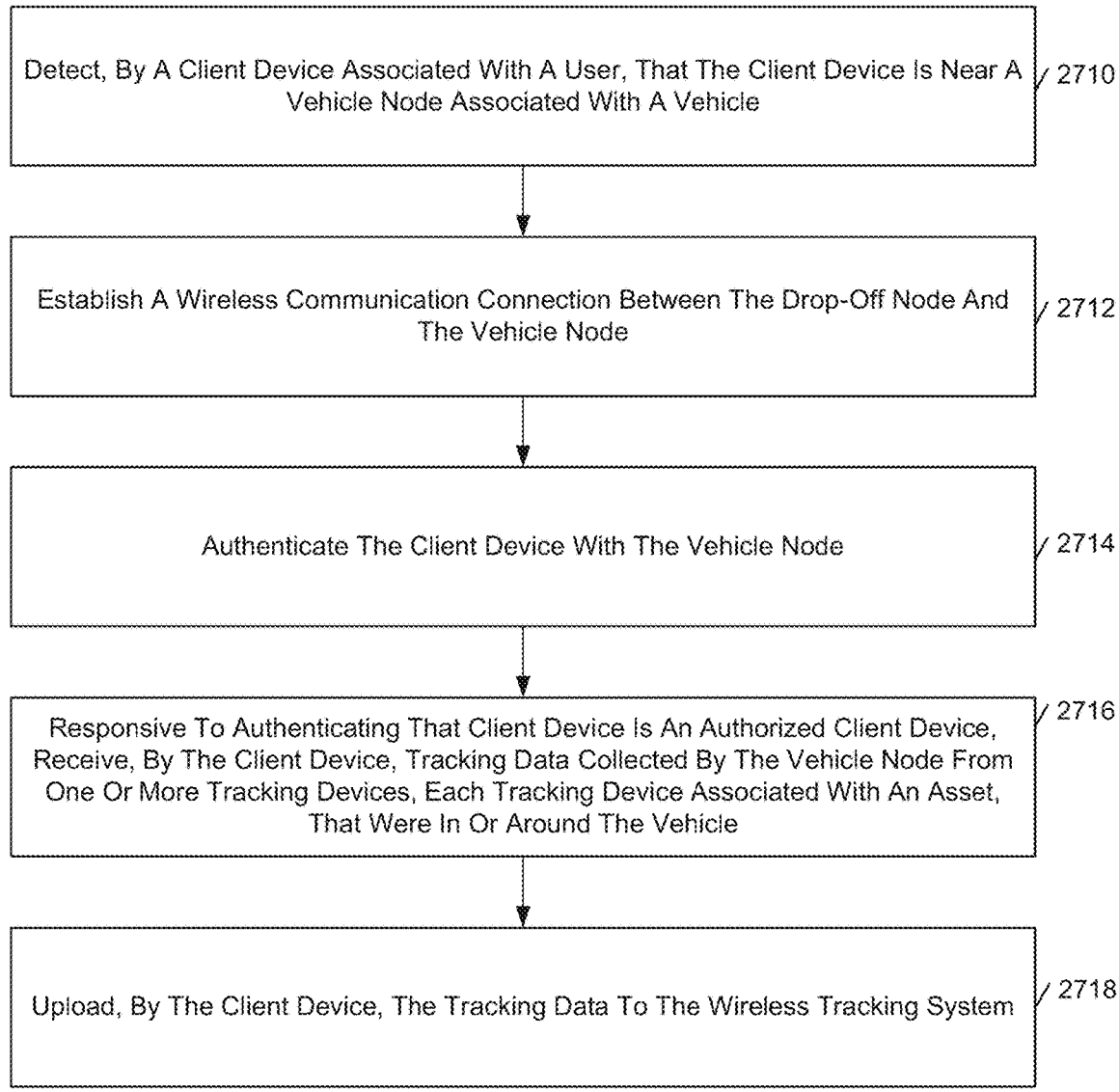
FIG. 27 is a flowchart for an example method 2701 of using a client device to collect tracking data on assets monitored by associated tracking devices in a vehicle, according to some embodiments.

FIG. 27 is a flowchart for an example method 2701 of using a client device to collect tracking data on assets monitored by associated tracking devices in a vehicle, according to some embodiments.

The method 2701 includes detecting, by a client device associated with a user, that the client device is near a vehicle node associated with a vehicle. The detection may be based on receiving wireless signals being transmitted from the vehicle node, such as broadcast signals, in some embodiments. The client device and the vehicle node establish 2712 a wireless communication connection between the drop-off node and the vehicle node. The client device is authenticated 2714 by the vehicle node to authenticate that the client device is an authorized client device of the tracking system.

Responsive to authenticating that client device is an authorized client device, the client device receives 2716 tracking data collected by the vehicle node from one or more tracking devices, each tracking device associated with an asset that was in or around the vehicle. The client device then uploads 2718 all or a portion of the tracking data to the wireless tracking system.

Figure 28:
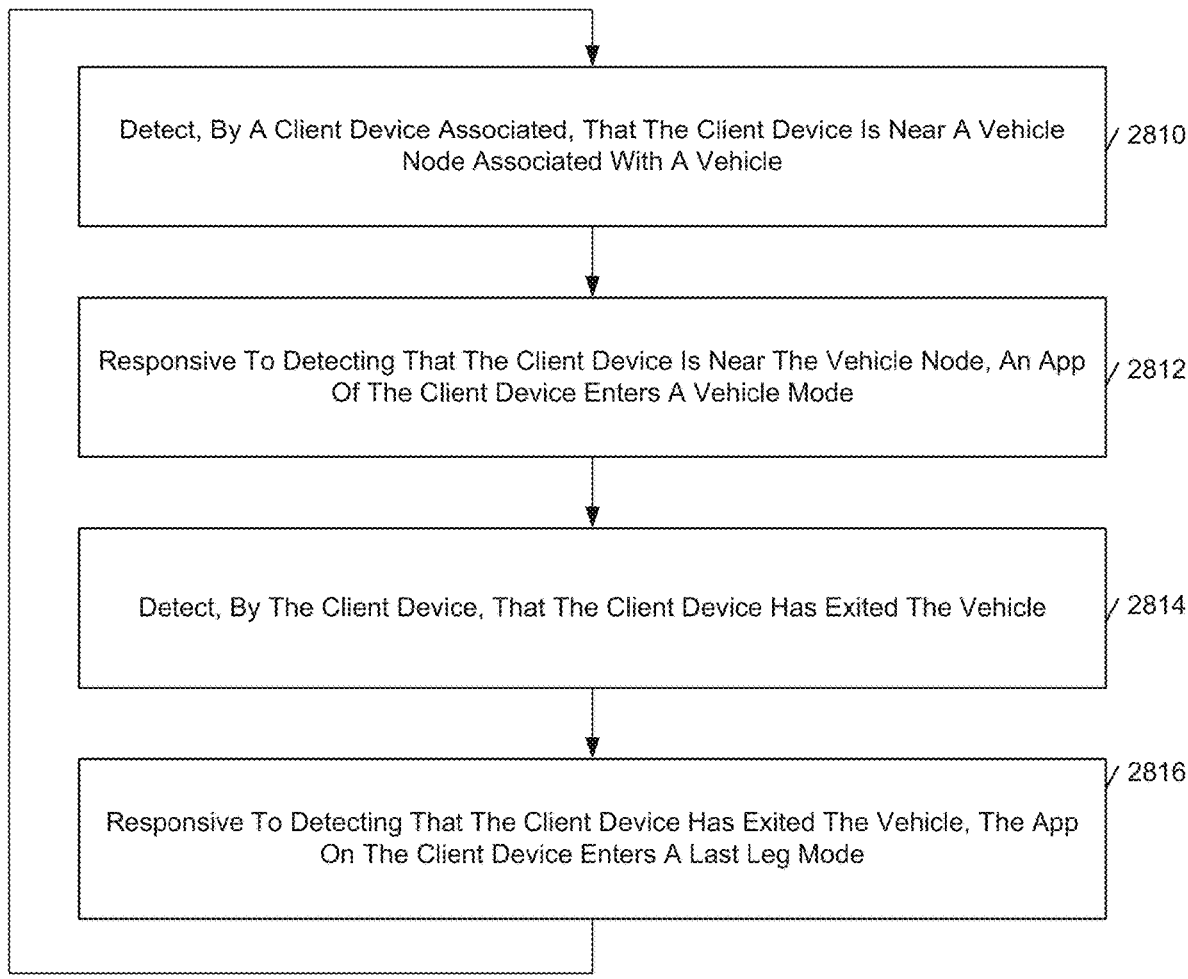
FIG. 28 is a flowchart for an example method 2801 of changing between a vehicle mode and a last leg mode for an asset tracking application on a client device, according to some embodiments.

FIG. 28 is a flowchart for an example method 2801 of changing between a vehicle mode and a last leg mode for an asset tracking application on a client device associated with a user or driver of the vehicle, according to some embodiments. The asset tracking application, being executed by the client device, is associated with the wireless tracking system 400. The method 2801 includes, detecting 2810, by the client device, that the client device is near a vehicle node associated with the vehicle.

Responsive to detecting that the client device is near the vehicle node, the app on the client device enters a vehicle mode, wherein the vehicle mode enables functions of the app and the client device that correspond to a needs of the wireless tracking system 400 while the user is in or around the vehicle. The detection may be based on wireless communications (e.g., Bluetooth or BLE communications) between the client device and the vehicle node.

Later, the client device detects 2814 that the client device and the user has exited the vehicle. This may also be based on wireless communications between the client device and the vehicle node, according to some embodiments. In other embodiments, the detection is based on location data for the vehicle and location data for the client device received by the client device.

Responsive to detecting that the client device has exited the vehicle, the app on the client device enters 2816 a last leg mode. The last leg mode enables functions of the app and the client device that correspond to a last leg of a journey for the user or delivery of an asset. The last leg mode may include collecting location data with a higher frequency, enabling GPS tracking of the client device, issuing instructions to tracking devices associated with an asset to collect location data, issuing instructions to tracking devices associated with an asset to collect location data with a higher frequency, issuing instructions to tracking devices associated with an asset to perform certain functions, or other functions of the app and the client device.

Figure 29:
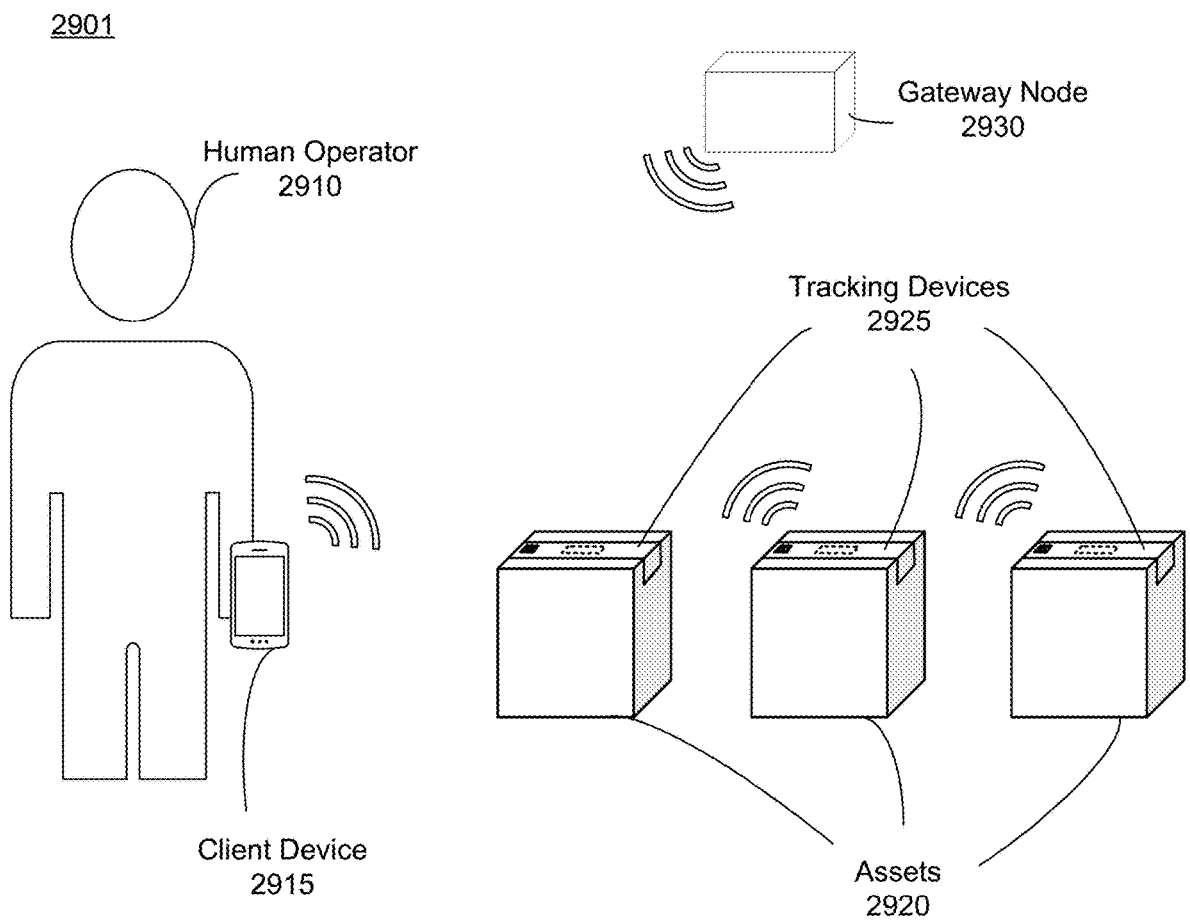
FIG. 29 shows an example environment 2901 including a client device 2915 that acts as a gateway node for tracking devices 2925 and wireless nodes 2930 in a wireless tracking system, according to some embodiments.

FIG. 29 shows an example environment 2901 including a client device 2915 that acts as a gateway node for tracking devices 2925 and wireless nodes 2930 in a wireless tracking system, according to some embodiments. The client device 2915 may be associated with a human operator 2910, as shown in FIG. 29 according to some embodiments. The client device 2915 includes an app is configured to scan the environment 2901 for tracking devices 2925 using one or more wireless communication interfaces of the client device 2915. For example, the client device 2915 may check for any tracking devices 2925 with a broadcasted Bluetooth communication link in the environment 2901. The client device establishes a wireless communication connection with each detected of the detected tracking devices 2925 and receives tracking data from the tracking devices 2925. The wireless communication between the client device 2915 and the tracking devices 2925 is performed using a first wireless communication interface type and protocol that has a corresponding first communication range. The client device may store the received tracking data on a memory of the client device 2915. The client device 2915 then transmits some or all of the tracking data to a server of the wireless tracking system 400 using a second communication interface type and protocol having a corresponding second communication range. The second communication range is larger than the first communication range. For example, the client device 2915 may transmit the tracking data to the server of the wireless tracking system 400 using cellular network communications (e.g., data, 4G/LTE, 5G cellular communications). Thus, the client device 2915 using the app functions as a gateway node for relaying tracking data from the tracking devices 2925 to the server(s) of the wireless tracking system 400. The client device 2915 and the app may be configured to automatically scan and detect tracking devices and perform the relaying of tracking data as the human operator carrying the client device 2915 travels. Therefore, the client device 2915 functions as a mobile gateway that automatically gathers and relays tracking data from tracking devices as the client device 2915 travels a route.

Figure 30:
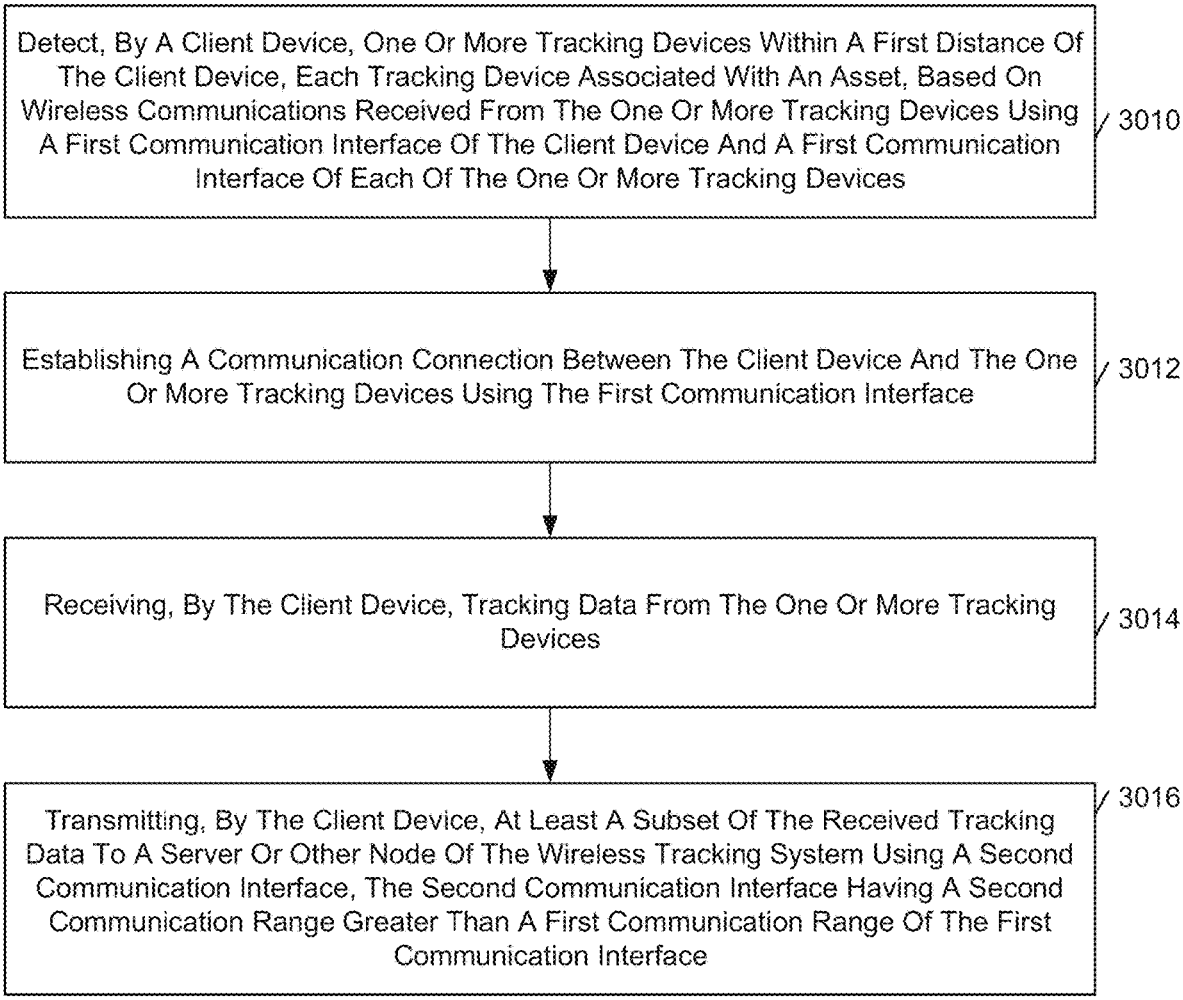
FIG. 30 is a flowchart for an example method 3001 of using a client device as a gateway node for tracking devices and wireless nodes in a wireless tracking system, according to some embodiments.

Similarly, the client device 2915 may communicate with a gateway node 2930 that is associated with a location using a FIG. 30 is a flowchart for an example method 3001 of using a client device as a gateway node for tracking devices and wireless nodes in a wireless tracking system, according to some embodiments.

The method includes 3001 detecting 3010, by a client device, one or more tracking devices within a first distance of the client device, each tracking device associated with an asset, based on wireless communications received from the one or more tracking devices using a first communication interface of the client device and a first communication interface of each of the one or more tracking devices. The client device and the one or more tracking devices establish 3012 a communication connection between the client device and the one or more tracking devices using the first communication interface. The client device then receives 3014 tracking data from the one or more tracking devices, and the client device transmits 3016, at least a subset of the received tracking data to a server or other node of the wireless tracking system using a second communication interface, the second communication interface having a second communication range greater than a first communication range of the first communication interface.

Computer Apparatus

Figure 31:
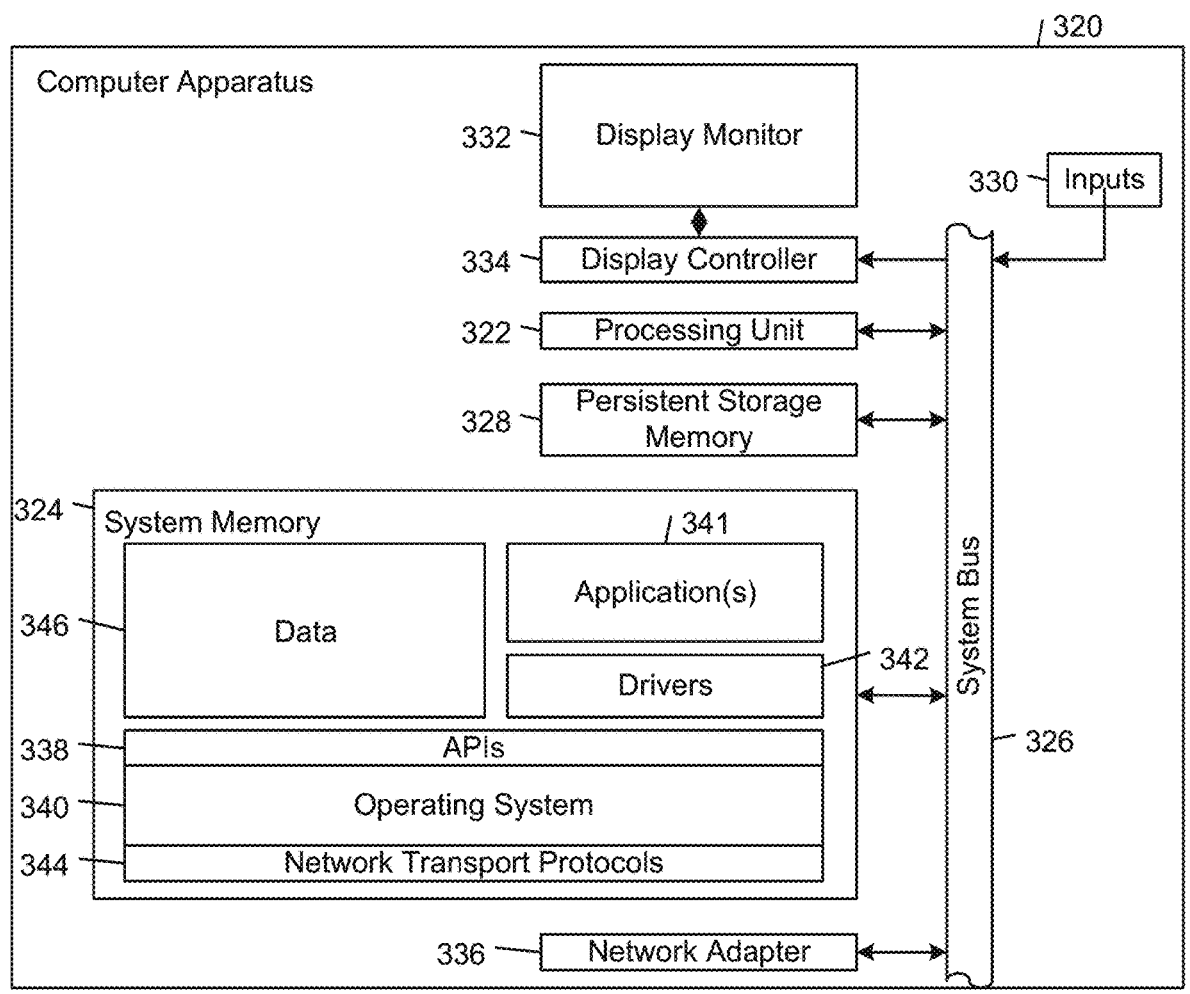
FIG. 31 shows an example embodiment of computer apparatus, according to some embodiments.

FIG. 31 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments.

In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system for tracking assets at a location comprising:
an infrastructure node associated with a tracking system located at the location comprising a wireless communication device configured to wirelessly communicate with other wireless nodes of the tracking system, the infrastructure node associated with the location; and
a plurality of wireless tracking devices, each wireless tracking device of the plurality of wireless tracking devices associated with an asset being tracked by the tracking system and configured to wirelessly communicate with the infrastructure node when located within a threshold distance of the infrastructure node, wherein
the infrastructure node is configured to determine that a first asset associated with a first wireless tracking device of the plurality of wireless tracking devices is in the location, based on wireless communication between the infrastructure node and the first wireless tracking device,
in response to the infrastructure node detecting that the first asset has been removed from the location, the infrastructure node is configured to determine if the removal of the first asset from the location was authorized, based on detected conditions at the time of removal and based on a received first set of rules, the detected conditions including conditions of the first asset and the location and
the first set of rules include conditions that correspond to authorized removal of the first asset from the location.

2. The system of claim 1, wherein, in response to the infrastructure node determining that the removal of the first asset from the location was unauthorized, the infrastructure node is configured to transmit an alert indicating the authorized removal to another wireless node the tracking system or a server associated with the tracking system.

3. The system of claim 2, further comprising a first client device associated with a first user, wherein the first asset is removed from the location by the first user carrying the first client device, the infrastructure node transmits the alert to the first client device, and wherein the alert is displayed on the first client device and includes instructions to remove the second asset from the location.

4. The system of claim 1, wherein the rules comprise a condition that authorized removal of the first asset from the location occur within a specific range of times.

5. The system of claim 1, wherein the rules comprise a condition that authorized removal of the first asset is performed by an authorized user.

6. The system of claim 5, further comprising an authorized client device associated with the authorized user, wherein the authorized client device is configured to wirelessly communicate with the infrastructure node and, based on wireless communications between the client device and the infrastructure node at the time of the removal of the first asset from the location, the infrastructure node determines that the authorized user has performed the removal of the first asset from the location.

7. The system of claim 5, further comprising a user wireless node comprising a wireless tracking device associated with the authorized user, wherein the user wireless node is configured to wirelessly communicate with the infrastructure node and, based on wireless communications between the user wireless node and the infrastructure node at the time of the removal of the first asset from the location, the infrastructure node determines that the authorized user has performed the removal of the first asset from the location.

8. The system of claim 1, wherein the infrastructure node is configured to detect that a second asset has entered the location based on wireless communications between a second wireless tracking device of the plurality of wireless tracking devices and the infrastructure node, the second asset associated with the second wireless tracking device.

9. The system of claim 8, wherein the infrastructure node is configured to determine if the addition of the second asset to the location was authorized, based on a received second set of rules for the second asset.

10. The system of claim 9, wherein in response to determining that the addition of the second asset to the location is unauthorized, the infrastructure node is configured to transmit an alert indicating the authorized removal to another wireless node the tracking system or a server associated with the tracking system.

11. The system of claim 10, further comprising a second client device associated with a second user, wherein the second asset is added to the location by the second user, the infrastructure node transmits the alert to the second client device, and wherein the alert is displayed on the client device and includes instructions to remove the second asset from the location.

12. The system of claim 8, wherein the second set of rules is received from the second wireless tracking device.

13. The system of claim 1, wherein the infrastructure node is configured to store, on a memory or storage of the infrastructure node, a manifest tracking assets at the location, and wherein the infrastructure node is configured to update the manifest, in response to detecting that an asset has entered the location or that an asset that was previously in the location has been removed from the location.

14. The system of claim 1, wherein the first set of rules is received from the first wireless tracking device.

15. A system for tracking assets in a vehicle comprising:
a vehicle node associated with a tracking system located on or inside of the vehicle, the vehicle node comprising a wireless communication device configured to wirelessly communicate with other wireless nodes of the tracking system, the vehicle node associated with the current location of the vehicle; and
a plurality of wireless tracking devices, each wireless tracking device of the plurality of wireless tracking devices associated with an asset being tracked by the tracking system and configured to wirelessly communicate with the vehicle node when located within a threshold distance of the vehicle node, wherein
the vehicle node is configured to determine that a first asset associated with a first wireless tracking device of the plurality of wireless tracking devices is in the vehicle, based on wireless communication between the vehicle node and the first wireless tracking device,
in response to the infrastructure node detecting that the first asset has been removed from inside of the vehicle, the vehicle node is configured to determine if the removal of the first asset from the vehicle was authorized, based on detected conditions at the time of removal and based on a received first set of rules, the detected conditions including conditions of the first asset and the location, and
the first set of rules include conditions that correspond to authorized removal of the first asset from the vehicle.

16. The system of claim 15, further comprising an authorized client device associated with an authorized user, wherein the authorized client device is configured to wirelessly communicate with the vehicle node and, based on wireless communications between the client device and the vehicle node at the time of the removal of the first asset from the vehicle, the infrastructure node determines that the authorized user has performed the removal of the first asset from the vehicle.

17. The system of claim 15, wherein the first set of rules include conditions that an authorized removal of the first asset from the vehicle occurs when the location of the vehicle corresponds to a location associated with the first asset.

18. A method comprising:
wirelessly communicating, by an infrastructure node associated with a region, with one or more wireless tracking devices inside of the region, each of the one or more wireless tracking devices associated with at least one asset;
receiving from the one or more wireless tracking devices, by the infrastructure node, identifiers for each of the one or more wireless tracking devices;
determining, by the infrastructure node, that one or more assets are inside the region, based on the communications between the infrastructure node and the one or more wireless tracking devices;
receiving rules for each of the one or more assets that correspond to conditions in which each of the assets may be removed with authorization;
detecting, by the infrastructure node, that a first asset of the one or more assets has been removed from the region based on wireless communications between the infrastructure node and a first client device of the one or more wireless tracking devices; and
determining, by the infrastructure node, that the first asset was removed without authorization based on detected conditions of the removal of the first asset and on the received rules.

\* \* \* \* \*

UNITED STATES PATENT AND TRADEMARK OFFICE
CERTIFICATE OF CORRECTION

| | | |
|---|---|---|
| PATENT NO. | : 11,776,380 B2 | Page 1 of 1 |
| APPLICATION NO. | : 17/834925 | |
| DATED | : October 3, 2023 | |
| INVENTOR(S) | : Hendrik J Volkerink et al. | |

It is certified that error appears in the above-identified patent and that said Letters Patent is hereby corrected as shown below:

On the Title Page

Item (72), In the Inventors list that currently reads:
"Hendrik J Volkerink, Palo Alto, CA (US); Ajay Khoche, West San Jose, CA (US)", Should read:
-- Hendrik J Volkerink, Palo Alto, CA (US); Ajay Khoche, West San Jose, CA (US); Rohit Govindbhai Chudasama, Fremont, CA (US) --.

Signed and Sealed this
Twenty-fifth Day of November, 2025

John A. Squires
*Director of the United States Patent and Trademark Office*